(12) United States Patent
Huang et al.

(10) Patent No.: US 7,693,974 B2
(45) Date of Patent: *Apr. 6, 2010

(54) SYSTEM AND METHOD FOR PROVIDING A GRAPHICAL USER INTERFACE TO, FOR BUILDING, AND/OR FOR MONITORING A TELECOMMUNICATION NETWORK

(75) Inventors: Ye Huang, San Jose, CA (US); William Lawton Crowe, Olathe, KS (US); Royal Dean Howell, Trimble, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1766 days.

This patent is subject to a terminal disclaimer.

(21) Appl. No.: 10/773,913

(22) Filed: Feb. 6, 2004

(65) Prior Publication Data

US 2004/0155900 A1 Aug. 12, 2004

Related U.S. Application Data

(63) Continuation of application No. 09/216,354, filed on Dec. 18, 1998, now Pat. No. 6,714,217.

(51) Int. Cl.
*G06F 15/177* (2006.01)
(52) U.S. Cl. ...................... 709/223; 715/736
(58) Field of Classification Search .............. 709/223, 709/224; 715/734–737; 370/352
See application file for complete search history.

(56) References Cited

U.S. PATENT DOCUMENTS 4,491,945 A 1/1985 Turner
4,683,584 A 7/1987 Chang et al.
4,686,669 A 8/1987 Chang
4,686,701 A 8/1987 Ahmad et al.

(Continued)

FOREIGN PATENT DOCUMENTS

EP 0439098 7/1991

(Continued)

OTHER PUBLICATIONS

Kuribayashi, Shin-Ichi; Advanced Signaling Protocol for Broadband ISDN Services; Electronics and Communications in Japan; Part 1, vol. 78, No. 1, pp. 1-12.

(Continued)

*Primary Examiner*—David Lazaro

(57) ABSTRACT

A system and method for providing a graphical user interface (GUI) for network development, management, and monitoring includes a GUI front end that provides a graphical representation of a telecommunication network comprised of communication devices represented by GUI network elements. A network proxy provides a communication layer between the GUI and a network server and allows the GUI to connect to multiple instances of a network server without having to hard code the connections to the network servers. The network proxy transmits commands and messages between the network server and the GUI. The network server determines how to handle traffic in the network model, such as how to provide call setup, call routine, and call tear down. The network server transmits call routing commands and messages to the network proxy which dispatches them to the GUI. An external systems interface provides the mechanism for which the network server communicates with communication devices in an external system.

17 Claims, 12 Drawing Sheets

U.S. PATENT DOCUMENTS

| | | |
|---|---|---|
| 4,720,850 A | 1/1988 | Oberlander et al. |
| 4,730,312 A | 3/1988 | Johnson et al. |
| 4,736,364 A | 4/1988 | Basso et al. |
| 4,748,658 A | 5/1988 | Gopal et al. |
| 4,757,526 A | 7/1988 | Foster et al. |
| 4,763,317 A | 8/1988 | Lehman et al. |
| 4,799,153 A | 1/1989 | Hann et al. |
| 4,853,955 A | 8/1989 | Thorn et al. |
| 4,970,721 A | 11/1990 | Aczel et al. |
| 4,991,169 A | 2/1991 | Davis et al. |
| 4,991,172 A | 2/1991 | Cidon et al. |
| 5,003,584 A | 3/1991 | Benyacar et al. |
| 5,029,199 A | 7/1991 | Jones et al. |
| 5,048,081 A | 9/1991 | Gavaras et al. |
| 5,051,983 A | 9/1991 | Kammerl |
| 5,084,816 A | 1/1992 | Boese et al. |
| 5,089,954 A | 2/1992 | Rago |
| 5,115,426 A | 5/1992 | Spanke |
| 5,115,427 A | 5/1992 | Johnson, Jr. et al. |
| 5,185,743 A | 2/1993 | Murayama et al. |
| 5,204,857 A | 4/1993 | Obara |
| 5,251,255 A | 10/1993 | Epley |
| 5,258,979 A | 11/1993 | Oomuro et al. |
| 5,268,895 A | 12/1993 | Topper |
| 5,271,010 A | 12/1993 | Miyake et al. |
| 5,274,635 A | 12/1993 | Rahman et al. |
| 5,274,698 A | 12/1993 | Jang |
| 5,278,972 A | 1/1994 | Baker et al. |
| 5,282,244 A | 1/1994 | Fuller et al. |
| 5,289,472 A | 2/1994 | Cho |
| 5,291,492 A | 3/1994 | Andrews et al. |
| 5,297,147 A | 3/1994 | Shimokasa |
| 5,305,312 A | 4/1994 | Fornek et al. |
| 5,327,421 A | 7/1994 | Hiller et al. |
| 5,329,308 A | 7/1994 | Binns et al. |
| 5,339,318 A | 8/1994 | Tanaka et al. |
| 5,345,443 A | 9/1994 | D'Ambrogio et al. |
| 5,345,445 A | 9/1994 | Hiller et al. |
| 5,345,446 A | 9/1994 | Hiller et al. |
| 5,363,433 A | 11/1994 | Isono |
| 5,375,124 A | 12/1994 | D'Ambrogio et al. |
| 5,377,186 A | 12/1994 | Wegner et al. |
| 5,392,402 A | 2/1995 | Robrock, II |
| 5,394,463 A | 2/1995 | Fischell et al. |
| 5,420,858 A | 5/1995 | Marshall et al. |
| 5,422,882 A | 6/1995 | Hiller et al. |
| 5,425,090 A | 6/1995 | Orriss |
| 5,428,609 A | 6/1995 | Eng et al. |
| 5,434,852 A | 7/1995 | La Porta et al. |
| 5,434,981 A | 7/1995 | Lenihan et al. |
| 5,438,527 A | 8/1995 | Feldbaumer et al. |
| 5,438,570 A | 8/1995 | Karras et al. |
| 5,440,563 A | 8/1995 | Isidoro et al. |
| 5,440,626 A | 8/1995 | Boyle et al. |
| 5,444,713 A | 8/1995 | Backaus et al. |
| 5,452,297 A | 9/1995 | Hiller et al. |
| 5,452,350 A | 9/1995 | Reynolds et al. |
| 5,457,684 A | 10/1995 | Bharucha et al. |
| 5,459,722 A | 10/1995 | Sherif |
| 5,469,501 A | 11/1995 | Otsuka |
| 5,473,677 A | 12/1995 | D'Amato et al. |
| 5,473,679 A | 12/1995 | La Porta et al. |
| 5,483,527 A | 1/1996 | Doshi et al. |
| 5,485,455 A | 1/1996 | Dobbins et al. |
| 5,495,484 A | 2/1996 | Self et al. |
| 5,506,894 A | 4/1996 | Billings et al. |
| 5,509,010 A | 4/1996 | La Porta et al. |
| 5,519,690 A | 5/1996 | Suzuka et al. |
| 5,519,707 A | 5/1996 | Subramanian et al. |
| 5,519,770 A | 5/1996 | Stein |
| 5,530,724 A | 6/1996 | Abrams et al. |
| 5,533,115 A | 7/1996 | Hollenbach et al. |
| 5,537,461 A | 7/1996 | Bridges et al. |
| 5,541,917 A | 7/1996 | Farris |
| 5,544,163 A | 8/1996 | Madonna |
| 5,550,834 A | 8/1996 | D'Ambrogio et al. |
| 5,550,914 A | 8/1996 | Clarke et al. |
| 5,563,939 A | 10/1996 | La Porta et al. |
| 5,566,173 A | 10/1996 | Steinbrecher |
| 5,568,475 A | 10/1996 | Doshi et al. |
| 5,577,037 A | 11/1996 | Takatori et al. |
| 5,579,311 A | 11/1996 | Chopping et al. |
| 5,586,177 A | 12/1996 | Farris et al. |
| 5,590,133 A | 12/1996 | Billström et al. |
| 5,592,477 A | 1/1997 | Farris et al. |
| 5,600,643 A | 2/1997 | Robrock, II |
| 5,610,977 A | 3/1997 | Williams et al. |
| 5,619,561 A | 4/1997 | Reese |
| 5,623,491 A | 4/1997 | Skoog |
| 5,635,980 A | 6/1997 | Lin et al. |
| 5,636,261 A | 6/1997 | Fils |
| 5,640,446 A | 6/1997 | Everett et al. |
| 5,666,399 A | 9/1997 | Bales et al. |
| 5,673,262 A | 9/1997 | Shimizu |
| 5,689,550 A | 11/1997 | Garson et al. |
| 5,689,555 A | 11/1997 | Sonnenberg |
| 5,701,301 A | 12/1997 | Weisser, Jr. |
| 5,703,876 A | 12/1997 | Christie |
| 5,703,880 A | 12/1997 | Miura |
| 5,706,286 A | 1/1998 | Reiman et al. |
| 5,710,769 A | 1/1998 | Anderson et al. |
| 5,715,239 A | 2/1998 | Hyodo et al. |
| 5,745,553 A | 4/1998 | Mirville et al. |
| 5,751,706 A | 5/1998 | Land et al. |
| 5,765,108 A | 6/1998 | Martin et al. |
| 5,774,530 A | 6/1998 | Montgomery et al. |
| 5,774,675 A | 6/1998 | Uchida |
| 5,784,371 A | 7/1998 | Iwai |
| 5,793,765 A | 8/1998 | Boer et al. |
| 5,793,857 A | 8/1998 | Barnes et al. |
| 5,802,045 A | 9/1998 | Kos et al. |
| 5,825,780 A | 10/1998 | Christie |
| 5,828,666 A | 10/1998 | Focsancanu et al. |
| 5,850,391 A | 12/1998 | Essigmann |
| 5,862,334 A | 1/1999 | Schwartz et al. |
| 5,867,495 A | 2/1999 | Elliott et al. |
| 5,867,562 A | 2/1999 | Scherer |
| 5,867,571 A | 2/1999 | Borchering |
| 5,872,779 A | 2/1999 | Vaudreuil |
| 5,872,785 A | 2/1999 | Kienberger |
| 5,884,262 A | 3/1999 | Wise et al. |
| 5,889,954 A | 3/1999 | Gessel et al. |
| 5,892,764 A | 4/1999 | Riemann et al. |
| 5,915,009 A | 6/1999 | Williams et al. |
| 5,920,562 A | 7/1999 | Christie et al. |
| 5,926,464 A | 7/1999 | Fraser |
| 5,940,393 A | 8/1999 | Duree et al. |
| 5,940,491 A | 8/1999 | Anderson et al. |
| 5,940,492 A | 8/1999 | Galloway et al. |
| 5,949,791 A | 9/1999 | Byers et al. |
| 5,949,871 A | 9/1999 | Kabay et al. |
| 5,956,334 A | 9/1999 | Chu et al. |
| RE36,416 E | 11/1999 | Szlam et al. |
| 5,991,301 A | 11/1999 | Christie |
| 5,999,525 A | 12/1999 | Krishnaswamy et al. |
| 5,999,594 A | 12/1999 | Mizoguchi et al. |
| 6,002,689 A | 12/1999 | Christie et al. |
| 6,014,378 A | 1/2000 | Christie et al. |
| 6,026,091 A | 2/2000 | Christie et al. |
| 6,031,840 A | 2/2000 | Christie et al. |
| 6,034,950 A | 3/2000 | Sauer et al. |
| 6,038,218 A | 3/2000 | Otsuka et al. |
| 6,069,890 A | 5/2000 | White et al. |
| 6,088,749 A | 7/2000 | Hebert et al. |

| | | |
|---|---|---|
| 6,122,294 A | 9/2000 | Hsu et al. |
| 6,133,919 A * | 10/2000 | Bormann et al. ............ 715/839 |
| 6,137,800 A | 10/2000 | Wiley et al. |
| 6,141,339 A | 10/2000 | Kaplan et al. |
| 6,144,658 A | 11/2000 | Lebizay et al. |
| 6,160,871 A * | 12/2000 | DuRee et al. ................. 379/9 |
| 6,169,735 B1 | 1/2001 | Allen, Jr. et al. |
| 6,175,574 B1 | 1/2001 | Lewis |
| 6,181,703 B1 | 1/2001 | Christie et al. |
| 6,185,215 B1 | 2/2001 | Aho |
| 6,208,618 B1 | 3/2001 | Kenney et al. |
| 6,208,637 B1 | 3/2001 | Eames |
| 6,249,572 B1 | 6/2001 | Brockman et al. |
| 6,324,173 B1 | 11/2001 | Deschaine et al. |
| 6,324,179 B1 | 11/2001 | Doshi et al. |
| 6,324,279 B1 | 11/2001 | Kalmanek, Jr. et al. |
| 6,327,270 B1 | 12/2001 | Christie et al. |
| 6,377,673 B1 | 4/2002 | Cho et al. |
| 6,385,193 B1 | 5/2002 | Civanlar et al. |
| 6,430,195 B1 | 8/2002 | Christie et al. |
| 6,449,259 B1 | 9/2002 | Allain et al. |
| 6,483,837 B1 | 11/2002 | Howell et al. |
| 6,487,200 B1 | 11/2002 | Fraser |
| 6,496,512 B1 | 12/2002 | Medhat |
| 6,501,753 B1 | 12/2002 | Lin et al. |
| 6,546,003 B1 | 4/2003 | Farris |
| 6,546,442 B1 | 4/2003 | Davis et al. |
| 6,560,241 B2 | 5/2003 | Christie et al. |
| 6,628,653 B1 | 9/2003 | Salim |
| 6,667,982 B2 | 12/2003 | Christie et al. |
| 6,674,745 B1 | 1/2004 | Schuster et al. |
| 6,690,674 B1 | 2/2004 | Christie et al. |
| 6,721,306 B1 | 4/2004 | Farris et al. |
| 6,765,903 B1 | 7/2004 | Allen, Jr. et al. |
| 6,847,611 B1 | 1/2005 | Chase et al. |
| 2003/0007492 A1 | 1/2003 | Christie et al. |
| 2004/0174880 A1 | 9/2004 | White et al. |
| 2004/0193329 A1 | 9/2004 | Ransom et al. |
| 2006/0023676 A1 | 2/2006 | Whitmore et al. |

FOREIGN PATENT DOCUMENTS

| | | |
|---|---|---|
| EP | 0 488 399 | 6/1992 |
| HU | 71152 | 11/1995 |
| JP | 1013534 | 1/1989 |
| JP | 1300738 | 12/1989 |
| JP | 2215247 | 8/1990 |
| JP | 4180324 | 6/1992 |
| JP | 4196635 | 7/1992 |
| JP | 5327751 | 12/1993 |
| JP | 6006320 | 1/1994 |
| JP | 6209365 | 7/1994 |
| JP | 7177061 | 7/1995 |
| JP | 7250099 | 9/1995 |
| JP | 8149137 | 6/1996 |
| WO | WO9214321 | 8/1992 |

OTHER PUBLICATIONS

Hungarian office action dated Jun. 23, 1999 citing Hungarian patent No. HU170127 for Hungarian Application No. P9900232; 2 pages.

Russian office action dated Apr. 22, 2002 citing Russian patent Nos. RU2013011 and RU2007880 for Russian Application No. 99112956; 6 pages.

Hiroshi Ishii and Masatoshi Kawarasaki; B-ISDN Signalling Protocol Capabilities; NTT Telecommunication Networks Laboratories; 1989; pp. 41.2.1-41.2.5.

Manu Bahl, et al.; "The Evolving Intelligent Interexchange Network—An SS7 Perspective;" Proceedings of the IEEE; Apr. 1992; pp. 637-643; vol. 80, No. 4.

IBM International Technical Support Organization; "Networking BroadBand Services (NBBS) Architecture Tutorial;" Jun. 1995; 248 pages; First Edition; Research Triangle Park, North Carolina, USA.

David J. Wright; "Voice over ATM: An Evaluation of Network Architecture Alternatives;" IEEE Network; Sep./Oct. 1996; pp. 22-27.

* cited by examiner

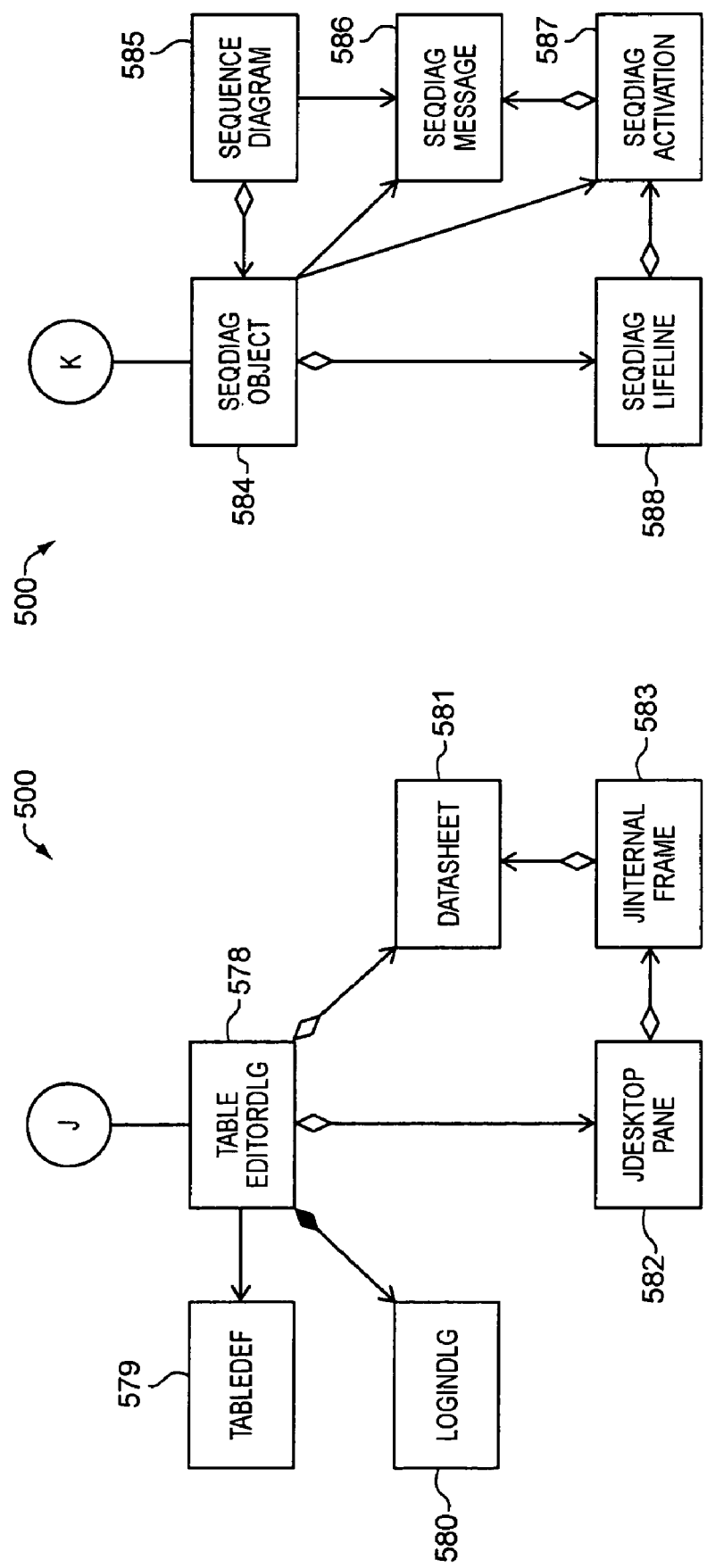

SYSTEM AND METHOD FOR PROVIDING A GRAPHICAL USER INTERFACE TO, FOR BUILDING, AND/OR FOR MONITORING A TELECOMMUNICATION NETWORK

RELATED APPLICATIONS

This application is a continuation of prior application Ser. No. 09/216,354, filed Dec. 18, 1998, entitled, "System and Method for Providing a Graphical User Interface to, for Building, and/or for Monitoring a Telecommunication Network," currently pending which is hereby incorporated by reference into this application.

FEDERALLY SPONSORED RESEARCH OR DEVELOPMENT

Not Applicable

MICROFICHE APPENDIX

Not Applicable

FIELD OF THE INVENTION

The present invention relates to the field of computer systems for graphical representations of, and processing of data for, telecommunication networks and systems.

BACKGROUND OF THE INVENTION

Telecommunications systems have many communication devices and other network elements interconnected to provide call connections. Call processing and management systems select connections for calls and route call traffic. The call processing and management systems may be reconfigured or replaced due to changes in the telecommunication system, such as additions of network elements, upgrades in equipment of computer software in the network elements, upgrades in equipment of computer software in the call processing and management systems, or changes in the methods of processing of calls.

In addition, new telecommunication systems are being developed. These new telecommunication systems will be configured and monitored during call set up, call tear down, and call routing.

When changes occur either in the telecommunication system or the call processing or management systems or when new telecommunication systems are being developed, it would be beneficial if the carrier or other entity making the changes was able to test the changes prior to their implementation. A system and method is needed that would allow the carrier or other entity to configure changes or additions to networks, to debug configurations, and to monitor and trace the call processing and connections for simulated networks, developing networks, or developed networks. The present system and methods fulfill these needs.

SUMMARY OF THE INVENTION

The present invention is directed to a system for developing, managing, and/or monitoring a network model. The system comprises a graphical user interface that is adapted to display a graphical representation of a plurality of network elements. A network server determines a destination point for a call and transmits a message designated for a particular network element identifying the destination point for the call. A network proxy receives the message from the network server and transmits the message to the graphical user interface. The graphical user interface receives the message from the network proxy and uses the identified destination point to display a route for the call.

BRIEF DESCRIPTION OF THE DRAWINGS

FIG. 5E is a continuation of the network development, management, and/or monitoring system of FIG. 5A.

FIG. 5F is a continuation of network development, management, and/or monitoring system of FIG. 5A.

DETAILED DESCRIPTION

Figure 1:
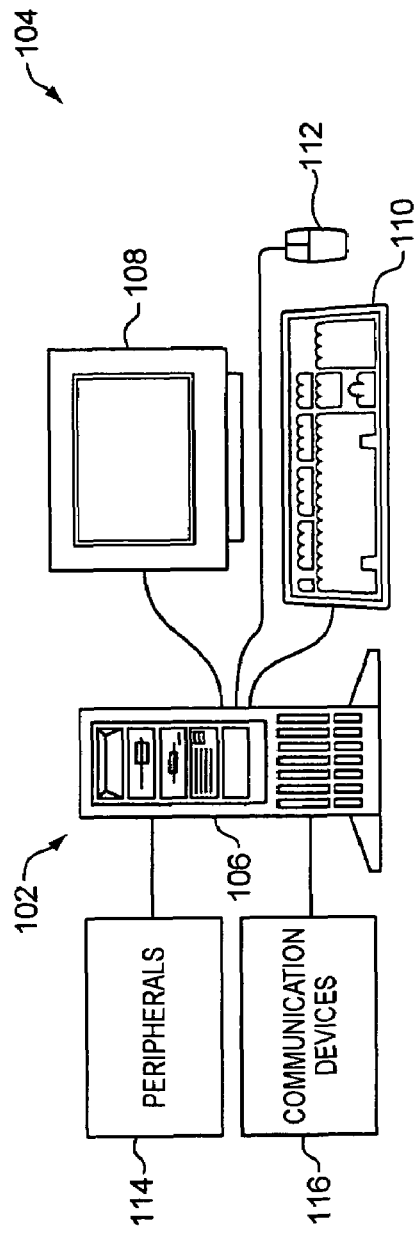
FIG. 1 is a block diagram of a computer system in accordance with an embodiment of the present invention.

Telecommunication systems have a number of communication devices in local exchange and interexchange environments that interact to provide call services to customers. Both traditional and intelligent network (IN) services and resources are used to process, route, or connect a call to a designated connection. A call has call signaling which carries information about the call and user communications that carries the actual data, such as the voice or data stream.

For example, a telecommunication system may have call signaling handling devices, such as signal transfer points (STPs) to transfer call signaling to destination points, signaling interfaces to handle call signaling, and call processors to process call signaling to select connections over which the user communications will be transported. In addition, a telecommunication system may have connecting elements, such as interworking units to interwork user communications from one format to another and asynchronous transfer mode (ATM) matrixes to transport user communications or signaling between ATM connections.

Also, the telecommunication system may have communication devices to initiate, handle, and receive a call. Moreover, the telecommunication system may have a management system, such as a call process control system (CPCS), to manage the devices in the network. Examples of such telecommunication networks are described in U.S. patent application Ser. No. 08/525,050 entitled System for Managing Telecommunications, U.S. patent application Ser. No. 09/027,008 entitled System and Method for Connecting a Call with an Interworking System, and U.S. patent application Ser. No. 09/026,766 entitled System for Treating a Call for Call Processing, the contents of which are incorporated herein by reference.

In many instances, a new telecommunication network must be developed. This may occur if communication devices are added to san existing network, a network of communication devices is to be developed or configured, or existing networks or communication devices in the networks are modified through changes in the hardware or software or changes in the way a call is processed or connected.

When the networks are being developed, it would be beneficial if the carrier or other entity that is developing the network had a tool with which the carrier could configure, test, and monitor the network and to debug systems and processes associated with the network prior to the implementation or re-implementation of the network. The present invention provides a tool that improves the ability of a network developer to build, modify, configure, or monitor one or more telecommunication networks.

The present invention is based on a multi-tier implementation of computer software and hardware which uses a graphical user interface (GUI) to provide network information. The present invention comprises a GUI front end to provide graphical network information and call routing and connection information, a network server to process call routing and connection information for the GUI front end, and a simulator network interface, a developing network, or a developed network interface to provide call signaling data and call connection data.

The multi-tier implementation allows a developer to configure a network and routing tables associated with call processing and call connections and to debug the routing tables and connections between communication devices in the network. The present invention also provides the ability to monitor network traffic for simulated network, developing network, or an interface to a developed network.

Moreover, calls and call processes from switching elements can be traced. For individual switching elements that process call signaling to select connections for calls, the system of the present invention traces the processing completed by the call processor or other routing engine and displays the processes' output to the GUI front end for viewing by a user. This allows a user to step through the call processing tables to view selections made by the call processor or other muting engine so that the user can determine if the call processor or other routing engine is operating correctly and the correct processes are implemented. Other advantages of the present invention will be apparent by the following description.

FIG. 1 illustrates an exemplary embodiment of a computer system of the present invention. The network development, management and/or monitoring system (NDMS) 102 comprises a software module that can be loaded on a computer system 104. Alternately, the NDMS 102 can be saved on a magnetic media, an optical media, or another form of storage media, whether volatile or non-volatile.

The computer system 104 comprises a computer processor 106, such as a personal computer, a mainframe, or a minicomputer, on which the NDMS 0.102 resides and is processed. The computer system 104 also has one or more monitors 108 on which information is output to one or more users, a keyboard 110 to provide input information to the system, and a mouse 112 to provide input information to the system.

The computer system 104 may contain peripherals 114, such as printers, direct access storage devices, other storage devices, or additional computer systems. In addition, the computer system 104 includes communication devices 116 with which it communicates and which are a part of a telecommunication network. Such communication devices 116 include one or more of a call processor, a switch, a CPCS or other management system, an interworking unit, a multiplexer, an ATM matrix, a signaling interface, an STP, a service platform, other network elements, and other devices that initiate, handle, receive, or terminate a call, including either call signaling or user communications.

The computer system 104 processes the NDMS software and any associated data and transmits and receives control messages and data to and from the computer system devices, including the monitor 108, the keyboard 110, the mouse 112, the peripherals 114, and the communication devices 116. The computer system 104 provides the GUI that allows information to be output to a user and received from a user.

Figure 2:
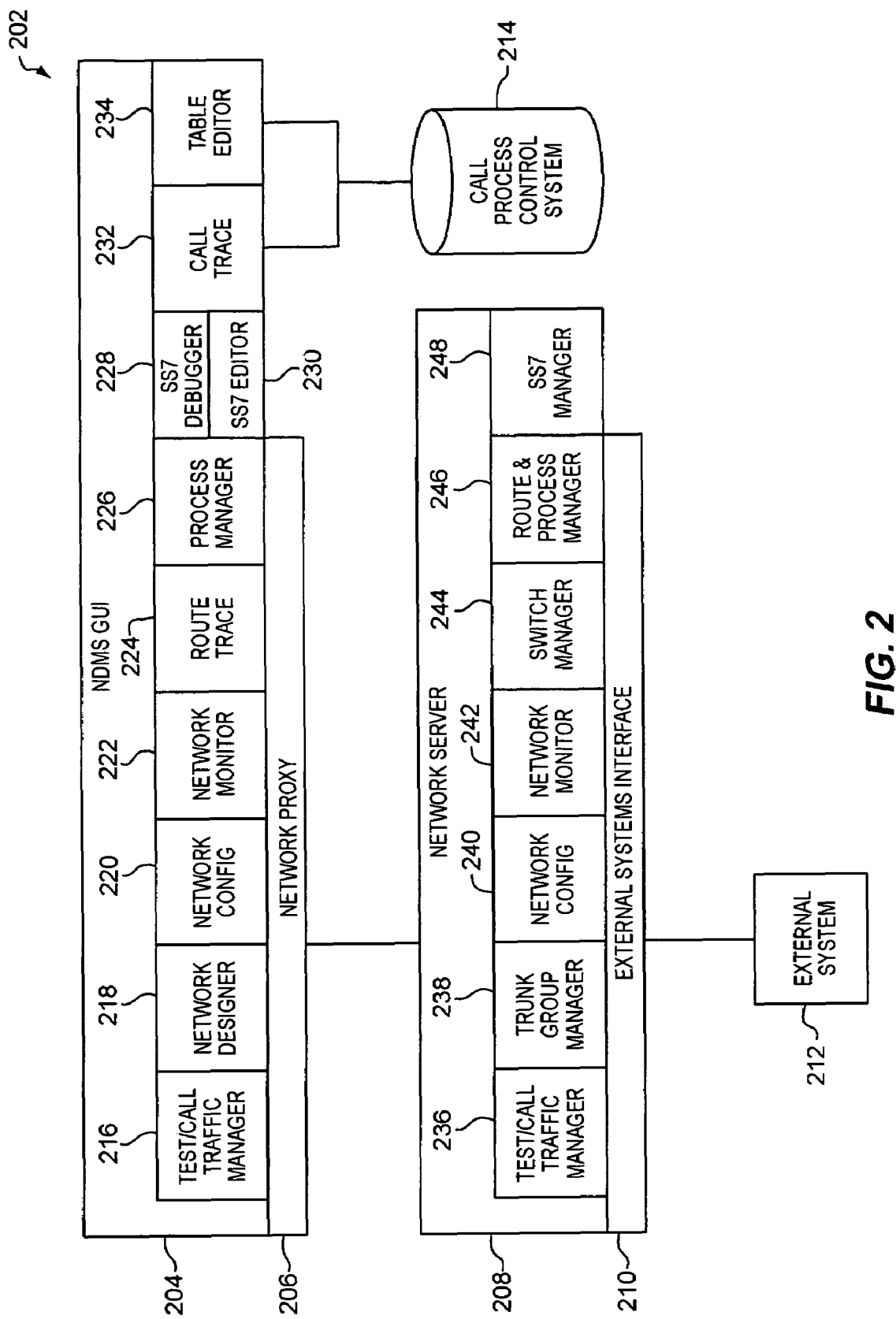
FIG. 2 is a block diagram of the processes of a computer and software system in accordance with an embodiment of the present invention.

FIG. 2 illustrates an exemplary embodiment of an NDMS system software with its associated process functionality. The NDMS 202 is comprised of an NDMS GUI 204 application, a network proxy 206 application, a network server 208 application, and an external systems interface 210. The external systems interface 210 communicates with one or more external systems 212. In addition, processes associated with the NDMS GUI 204 communicate with a management system, such as the call process control system (CPCS) 214.

The software modules for the NDMS 202 preferably are developed by using an object oriented type development language and tool. Preferably, the system is developed using the Java language owned by Sun Microsystems, Inc. Therefore, the descriptions herein may reference object oriented terminology. Although, other development tools may be used.

The NDMS GUI 204 provides a graphical representation of a telecommunication network comprised of communication devices represented by GUI network elements, such as call processors, signaling devices, switches, call connection devices, network paths, process databases, and phone sets. The NDMS GUI 204 allows a user to configure a network using data base tables and network elements.

In some instances, the NDMS GUI 204 accesses the CPCS 214 or other management system. The CPCS 214 contains routing tables and other data that is used by the call processor to select connections for calls and to further process call information. In addition, the CPCS 214 contains other management and administrative data, such as alarm data, configuration data from the other network elements, and billing information. This other management and administrative data may be accessed by the NDMS GUI 204 to further configure and monitor the telecommunication network.

In addition, once a network has been configured, the NDMS GUI 204 may be used to monitor call connections within the network. The NDMS GUI 204 displays the output of individual call processor processes and switch processes. The NDMS GUI 204 traces the processes implemented by routing engines within the call processors or switches along with the signaling system 7 (SS7) traffic and provides that information in the GUI environment for the user.

The network proxy 206 is a communications layer between the NDMS GUI 204 and the network server 208. Because the NDMS GUI 204 can communicate with multiple network servers, such as the implementations of the network server 208, the NDMS GUI 204 uses the network proxy 206 to connect to any implementation of a network server without having to hard code the connection to the network server. Thus, the network proxy 206 receives a command or message from the NDMS GUI 204 or its associate processes and determines the correct implementation of the network server 208 which is designated to receive the command or message. Likewise, when the network proxy 206 receives a command or message from any implementation of a network server, the network proxy determines the correct NDMS GUI process designated to receive the command or message and routes the command or message to that process. In addition the network proxy 206 provides a transparent interface so that the details of the remote method invocation for the objects are not displayed to the developer.

The network server 208 provides instructions on how to handle all of the network traffic. In addition, the network server 208 sends instructions to the network proxy 206 to cut or release paths within the network, to send call signaling to a particular network element, or to display trace outputs of call connections, links, or routing table lookups. The network proxy 206 transmits the instructions to the NDMS GUI 204.

The network server 208 provides a generic framework re build multiple implementations of particular network servers for particular network models. For example, the network server 208 can be used to build a simulator network, a developing network, or an interface to a developed network. The network server 208 then provides the framework to connect to external switches and other external network elements in these particular network models. In addition, the network server 208 routes message and commands that originate in the NDMS GUI 204 to the appropriate network model implementation.

The external systems interface 210 provides the mechanism in which the network server 208 communicates with an external system 212, such as a simulator network, a developing network, or an interface to a developed network. The external systems interface 210 exchanges control messages or commands with communication devices that are represented in the NDMS GUI 204 as network elements. These communication devices may include a signaling interface, a call processor, an interworking unit, a controllable ATM matrix, a switch, or some other type of communication device.

The external system 212 comprises any type of communication device in a simulated network, a developing network, or a developed network interface. Therefore, the external system 212 .may include communication devices, such as a signaling interface, a call processor, an interworking unit, a controllable ATM matrix, a switch, or any other type of communication device. The external system 212 exchanges control messages, including data and signaling, with the external systems interface 210.

The CPCS 214 is a management system for a simulated network, a developing network, or an interface to a developed network. The CPCS 214 collects alarm data and other administrative and management data for the communication devices in the external system 212. In addition, the CPCS 214 contains the routing engine database tables which are used by the routing engine in the call processor or switch to determine connections for calls and to implement other processing of calls. The CPCS 214 also manages accounting information.

The NDMS GUI 204 subsystems provide the framework and control systems for modeling a simulated network, a developing network, or an interface to a developed telecommunications network. It also is responsible for managing all of the GUI associated components and processes. The NDMS GUI 204 processes include a test/call traffic manager 216, a network designer 218, a network config 220, a network monitor 222, a route trace 224, a process manager 226, an SS7 debugger 228, an SS7 editor 230, a call trace 232, and a table editor 234.

The test/call traffic manager 216 manages SS7 graphical traffic and cut through. A separate model with its associate model file is created for each simulator network, developing network, or developed network. Therefore, a developing network may have a model represented in a model file. Whereas, a developed network may have a different model represented in a different model file.

Each model has a series of network elements, such as phone sets, end offices or other switches, call processors, and STPs, which are illustrated on the GUI so that they may be viewed by the user on a monitor or other output device. Each network element, which is represented by an associated object within the system, operates in conjunction with the test/call traffic manager 216 so that the network element objects may be able to determine how to render themselves. As used herein, the term "render" means to implement a procedure or event associated with a particular, object, such as to highlight a particular color, an icon, a path, a link, a connection, or another network element on the GUI so that it may be viewed by a user or to otherwise display information on the GUI to the user. As used herein, the term "class" refers to a definition of a type of structure and its operations. As used herein, the term "object" refers to an instance of a class.

A user initiates a test/call by using the test/call traffic manager 216. The user opens a phone set network element by selecting the phone set on the GUI. This opens a window, also referred to as a dialog, on the GUI which prompts the user to enter a phone number. A user enters a phone number to be dialed and presses the dial button.

The phone set sends an off-hook message to the switch to which it is connected. The phone set provides the dialed digits of the phone number to the switch.

The switch constructs an SS7 message and sends it to the network server 208. A response is sent back from the network server 208 that allows the test/call traffic manager 216 to determine the destination point for the next network element. This allows the test/call traffic manager 216 to render the next network element, such as a path, a connection, a link, an STP, or a call processor.

The next network element follows the same process of transmitting a message to the network server 208 and receiving a response to determine the next destination point. This process occurs until a path is cut through all of the call connecting network elements or until an error occurs which will not allow the path to be cut. As a result of this process, a user is able to identify the steps taken by the network elements for processing the call signaling and selecting one or more connections for the call so that a call can be connected from one network element, such as a phone set, to another network element, such as another phone set.

The system can be configured so that the network elements transmit a message to the network server 208 only if the network elements have an implementation on the network server. If the network element does not have an implementation on the network server 208, the message is routed to the next network element along the path to the destination point code (DPC) using the intelligent muting engine (IRE) to be described below.

The test/call traffic manager 216 generates the parameters that will be used by the network server to generate an SS7 message. The parameters are transmitted to the network server 208, and the network server 208 generates the SS7 messages to the external system 212.

The test/call traffic manager 216 can perform stress testing of the NDMS GUI 204 for a simulator network, a developing network, or a developed network interface. A series of test calls can be set up and torn down in an automated fashion in an effort to test load levels of the telecommunication network and/or to perform redundancy checks.

The test/call traffic manager 216 automatically synchronizes its data with the data and other messages contained within the network server 208 when a user opens a model file. If the network model file is in use by another user, the current state of the mode~ is reflected in the instance of that NDMS GUI 204. This allows multiple users to work on the same network model file, m share the current state of the model, and to localize the SS7 network traffic for debugging purposes.

The network designer 218 allows a user to dynamically create network model files. In addition, the network designer 218 provides for the graphical building and modifying of a network model. With the network designer 218 the user can drag and drop network elements from a network building stencil as well as rearrange the existing topology of network elements in a simulator network, a developing network, or an interface to a developed network.

Each network element has an associated configuration window that is implemented when the user selects that network element. The configuration window is used to enter and specify point codes, labels, starting circuit identification codes (CICs), and default values. The network designer 218 works with the network config 220 to store new or updated network model files on the network server 208.

Preferably, the network designer 218 is implemented as a module separate from a subsystem within the NDMS GUI 204. This allows the user to build and to modify network models without implementing the other functions of the NDMS GUI 204. This functionality acts as a fall-safe so that a user that is developing a new network model will not accidentally modify or change existing model files. In addition, this structure ensures that a model file that is under development is not available to end users until the developer releases the model file as a final product.

Figure 4:
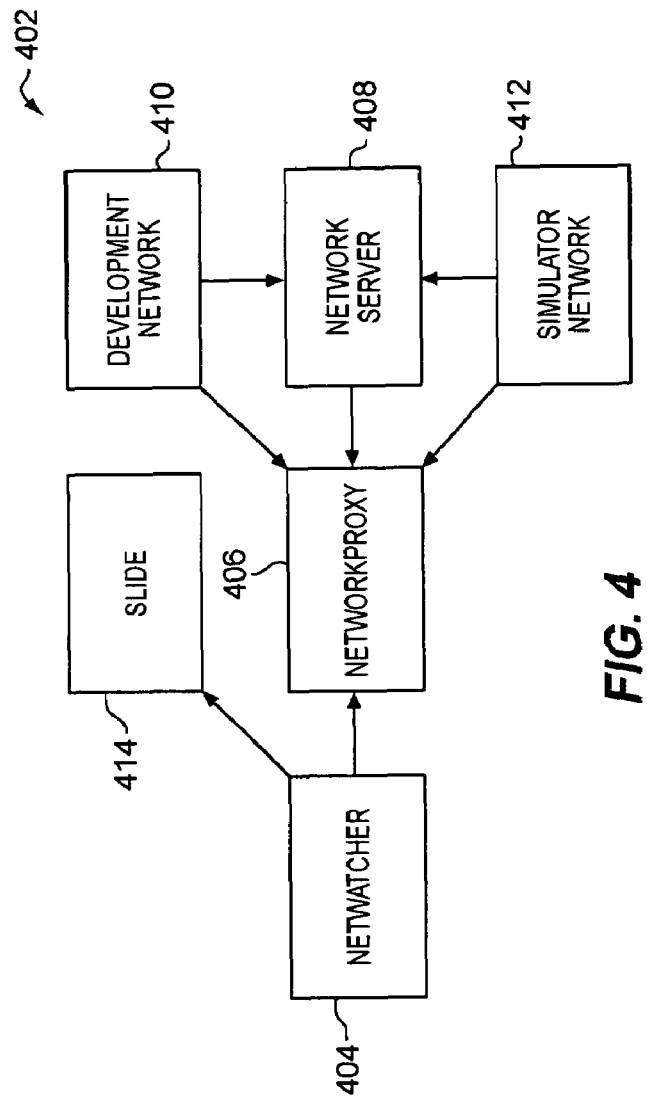
FIG. 4 is a block diagram of main functional modules for a software tool in accordance with an embodiment of the present invention.

The network config 220 loads model files with their associated models and configuration files which are stored a file server on the computer system 104 by the network server (see FIG. 4). The network config 220 initializes the models through a request to the network server 208 for a model file.

The network config 220 uses access control information to limit which users have access to which network models. Only the network models that can be opened by the requesting user are returned to the requesting network config 220. The network config 220 also performs operations for topology management of the network elements in each model and provides the mechanism for which the user may set parameters, such as a reply with an address complete message (ACM). In addition, the network config 220 allows the NDMS GUI 204 to run in any browser, such as Netscape Communicator or Microsoft Windows Explorer, because the network config 220 centralizes the data on a file server on the computer system 104.

The network monitor 222 is the command interface for the NDMS GUI 204. The network monitor 222 receives commands from the network server 208 for a path cut through, a circuit reservation, other connection-oriented commands, alarm or exception events, and other non-connection oriented messaging. A command may be issued by either the NDMS GUI 204 or the network server 208 to communicate the state of the network, to implement an action, or to do or undo an action.

The network monitor 222 stores commands issued through the NDMS GUI 204 and dispatches them to the network server 208 through the network proxy 206. A response is received back from the network server 208 to the network monitor 222 via the network proxy 206. The network monitor 222 ensures that the correct network element receives the command or message and that the operation is carried out for the particular network model configuration.

The route trace 224 graphically displays, in a sequence diagram the database lookups and steps taken in the call processing in the routing engine of the call processor or switch. The route trace 224 provides a frame by frame view of each table that is used to process the call signaling. This frame by frame view allows a user to view each message and the message detail information contained within each message, including the SS7 routing information. The user can select any message from the route trace displayed to the user. This includes the route trace information for the sequencing that occurs within the routing engine when the call signaling is processed, including the sequencing through the routing tables, and the sequencing that occurs between network elements in the network. The user can view and trace any call process and any message sequence.

The route trace 224 obtains the output of the CPCS 214 or other management system or of the routing engine of the call processor or switch via a connection to the network server 208. Because this graphical display of the frame by frame operation of the routing engine is output to a window and can be viewed by a user, the user may identify where a routing engine table lookup may fail in the future or has failed in the past.

Because of the potentially high volume of route tracing that may occur, the route trace 224 caches each of the messages and the related objects it receives for reuse. Message objects are cached not the actual message. This allows the route trace 224 to reduce the number of constructions and destructions of objects during an instance of the route trace 224.

The process manager 226 graphically displays the underlying processes of the NDMS 202, such as processes operating to simulate network elements or processes operating in conjunction with live network elements such as an interworking unit or a controllable ATM matrix. The process manager 226 is the mechanism through which a user may start, stop, and monitor the status and output of the underlying processes of the network elements. Each process that is managed by the process manager 226 is configured on a file server 104 on the computer system 104 with information pertaining to how to start the application, shut down the application, and which other processes must be started or shut down prior to the startup of the target application, and what to do if an application faults.

The SS7 debugger 228 and the SS7 editor 230 operate in conjunction with each other to allow a user to test and to debug SS7 call signaling. The SS7 debugger 228 allows a user to step through and examine SS7 call signaling within the network. The user may break the execution and processing of call signaling to see which messages are being processed. In addition, a user may step through a series of call signaling messages and through the processing of those signaling messages by each network element.

A user can open a window in the SS7 debugger 228 or the SS7 editor 230 to inspect the contents of all SS7 call signaling messages in the network or to make changes to individual messages. In addition, the SS7 debugger 228 and the SS7 editor 230 display the SS7 call signaling messages in a format that is readable by the user. Real SS7 call signaling messages are a series of bits that are stored internally as one bit stream within the NDMS 202. The call signaling messages are stored meta-data. The SS7 debugger 228 and the SS7 editor 230 translate the meta-data into tabular data, which can be read and identified by the user.

The call trace 232 interface graphically displays a call trace and allows the user to reproduce the call. The user may access the historical call information from the CPCS 214 via the call trace procedure 232 and search for a particular instance of a call. The call trace 232 allows the user to build a simple or a complex database query by specifying which fields of a database record on which to search. The call trace 232 then may be used to dispatch an initial address message (IAM) based upon the resulting call found through the search.

The table editor 234 graphically displays the database tables of the routing engine and allows a user to edit the database tables. Typically, the database tables are resident in the CPCS 214 and can be accessed by the table editor 234. The table editor 234 uses a multiple document interface so that each table is represented by a separate window. The user can open any table, query for data, and proceed to modify records by selecting the appropriate table row and changing the values.

The network server 208 has multiple processes that assist with management of paths for cut through, network monitoring, and management of SS7 data. The network server 208 comprises a test/call traffic manager 236, a trunk group manager 238, a network config 240, a network monitor 242, a switch manager 244, a route and process manager 246, and an SS7 manager 248.

The test/call traffic manager 236 tracks the CICs and path cut through of calls. The test/call traffic manager 236 receives commands and messages from the NDMS GUI 204, and those commands or messages are acted upon by a network element that has an implementation on the network server 208. For example, a network element that is represented on the NDMS GUI 204 may initiate a message to the test/call traffic manager 236, in the network server 208, to determine to which network element the call signaling or call connection. The test/call traffic manager 236 to determines to which network model implementation the message is to be transferred.

In addition, when the NDMS GUI 204 reserves a circuit, cuts a path, or rings a phone set, the NDMS GUI 204 sends a corresponding command to the test/call traffic manager 236. The test/call traffic manager 236 stores the command, if needed, and then broadcasts the command to the NDMS GUIs that are connected to the network server 208 and that are servicing the same model.

The trunk group manager 238 tracks busy and idle circuit for a trunk group between two network elements, such as between a switch and another switch. The trunk group manager 238 coordinates all of the reservations of the circuits within a trunk group and updates all of the NDMS GUIs that share the network model for which the circuit in the trunk group is reserved. In this manner, other NDMS GUIs will not attempt to reserve a circuit or trunk group that is already use.

The network config 240 centralizes configuration data on a single file server in the computer system 104. In response to a request from the NDMS GUI 204 via the network proxy 206, either the network config 240 transmits initialization and/or other configuration data to the NDMS GUI or the Network Config rejects the request. The network config 240 determines whether or not to provide the requested information based on whether the particular user that is requesting the information should have access to the information and whether the requested resource is available. The requested resource can be a file or a database entry for any of the network models that are stored on the file server of the computer system 104 by the network config 240. The requested resource also can be the access control information for each network model.

The network monitor 242 receives messages from the external system 212 by way of the external system interface 210 and routes messages to the appropriate process in the NDMS GUI 204. In addition, the network monitor 242 receives commands and messages from the NDMS GUI 204 and stores the commands and messages, if needed. The network monitor 242 then dispatches the command or message to any NDMS GUI that is sharing the network model file for which the command or message pertains.

For each network element that is represented in the NDMS GUI 204, there can be a corresponding network element in the external system 212. The network monitor 242 is responsible for transmitting messages or commands between the two. The network monitor 242 has a monitor thread for receiving commands and messages from each of the NDMS GUI 204 and the external system 212. The monitor thread receives incoming messages and commands, determines what the message or command is, transforms any data into a form required for processing by the NDMS GUI 204 or the external system 212, and sends the new data to the corresponding NDMS GUI 204 with its associated network element or to the external system 212 with its corresponding network element.

The network monitor 242 provides a library for the external system 212 in order to hide the protocol details and the protocol conversions for the communications layer from the external system. The library in the network monitor 242 provides the methods required for executing commands, sending trace information, notifying network elements in the external systems of failovers and alarms, notifying the NDMS GUI 204 of failovers and alarms, and sending SS7 messages.

The switch manager 244 implements connectivity to network elements in the external system 212 via the external systems interface 210. The switch manager 244 receives messages from the external system 212 and transmits those messages to the required corresponding network element in the NDMS GUI 204. In addition, the switch manager 244 receives messages and commands from the NDMS GUI 204 for network elements and transmits them to the corresponding switch or other network element in the external system 212.

The switch manager 244 uses a separate mediator thread to receive incoming messages and commands from the switch or other network element in the external system 212 and to send messages or commands back to the switch or other network element in the external system. By using the mediator thread, the switch manager 244 ensures that a switch or other network element in the external system 212 will not block or stop the operations of the switch manager 244 or the network server 208 because of input or output problems with the switch or other network element in the external system 212.

The route and process manager 246 collects the routing information used by the routing engine when the switch or call processor processes the call signaling. In addition, the route and process manager 246 is configured to contain the information for the underlying processes for which the programs run, such as how to start the process associated with the network element in an external system 212, how to shut down a process, and which processes must be started or shut down prior to the start or shut down of the target process.

The route and process manager 246 collects the process information and communicates it to the NDMS GUI 204, when requested, and to the external system 212. For each process, a monitor thread is started that tracks the process state, shuts the process down in response to a request from the user, and restarts the process if the process faults and if the route and process manager 246 is configured to restart the process.

The route and process manager 246 also contains the access control information that allows a user to stop a running process. In addition, the route and process manager 246 maintains the number of NDMS GUI connections so that the route and process manager can notify the NDMS GUI 204 of shutdowns or faults.

The SS7 manager 248 converts SS7 messages into representations of the SS7 messages that may be output in a manner that the user can understand. Internally, the SS7 messages that are received through the external system 212 are stored in an alternate representation as meta-data and not as the bit stream in which they were received. The SS7 data is stored in a hash table, and accessor and mutator methods are used for manipulating the data.

In addition, the SS7 manager 248 adds additional information, such as the next point code, the previous point code, the color of the object, whether the information is queued, and for which network element the information is queued. The original SS7 data and the additional information are combined into an SS7 extended message. This extended SS7 message allows the NDMS GUI 204 to render the SS7 extended message to the user in a window and to track the state of the message, such as where it is in the network and to which network element it is going next.

When the NDMS GUI 204 constructs an SS7 message, the NDMS 204 sends the message to the SS7 manager 248. This allows the SS7 manager 248 to initialize the SS7 message, if required, to override the default circuit reservation made by the NDMS GUI 204, to initialize the message according to other configuration data, and to prepare for an incoming call. After the message has been initialized by the SS7 manager 248, the SS7 manager transmits the SS7 message back to the NDMS GUI 204 or to the external system 212, as required.

Figure 3:
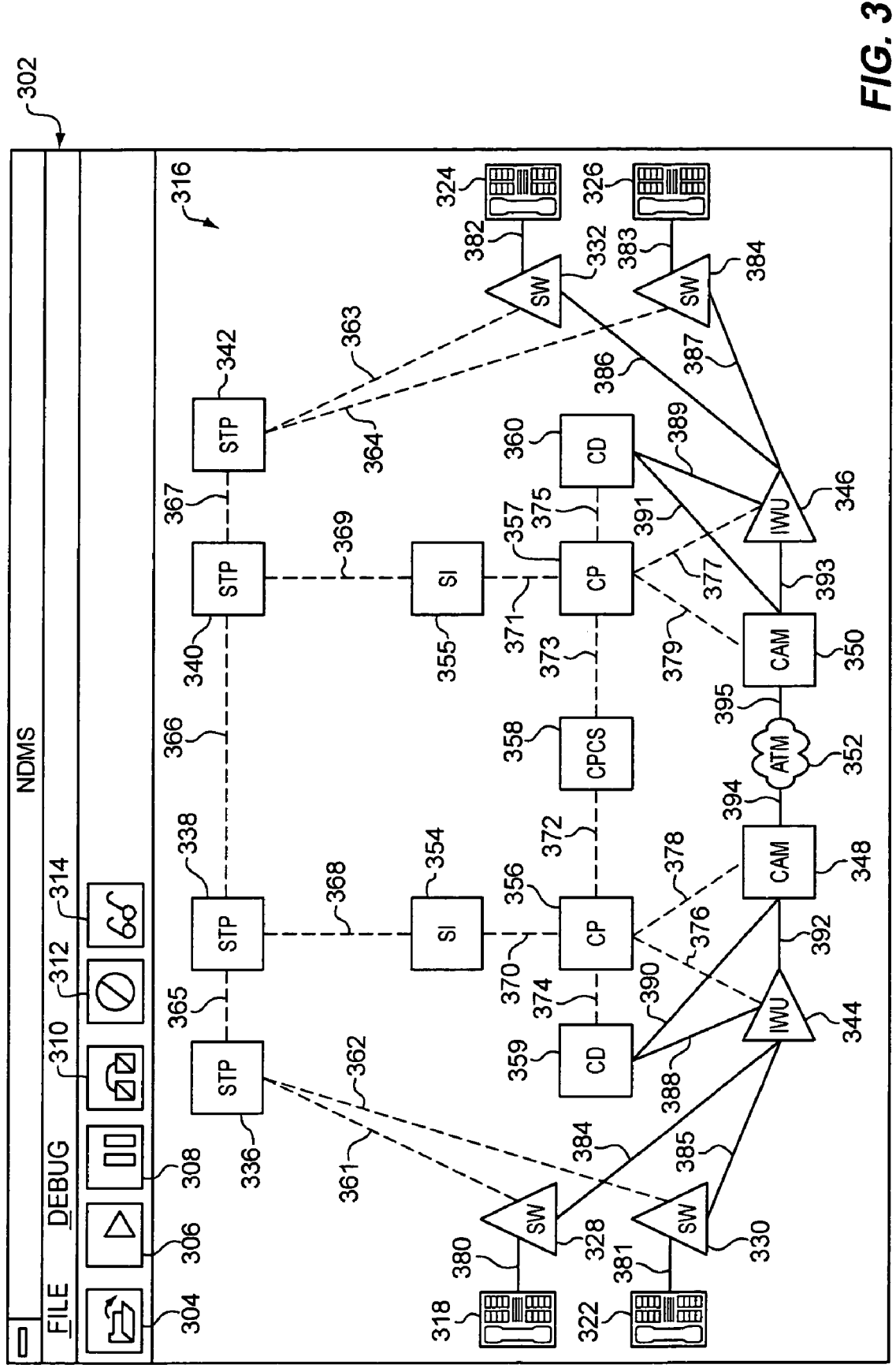
FIG. 3 is a diagrammatic representation of a graphical user interface in accordance with an embodiment of the present invention.

FIG. 3 illustrates an exemplary embodiment of a graphical user interface for the NDMS 202. In the illustrated embodiment, the GUI 302 has multiple buttons for implementing user options, including an open model file button 304, an execute normal operation button 306 for continuing normal operation of the processing of control messages and executing path cut-through, a break execution button 308 for breaking the execution of normal operation for a pause, a step button 310 for stepping through the operation of the processes for the network, a set break points button 312 for setting break points throughout the operation of the process of the execution, and a dialog button 314 for opening the SS7 editor/debugger window for showing the user which messages are being processed.

The user can build a network model that is comprised of a series of network elements. Each network model is loaded and saved in its own network model file. Different models may be developed for differing networks. For example, a simulator network may be developed, a developing network may be developed for a particular local exchange carrier (LEC) network, a developed network may be developed for an inter-exchange carrier (IXC) network, or another development may be developed for any other type of public or private telecommunications network.

An example of a network model 316 is shown as an exemplary embodiment for the GUI 302 of FIG. 3. Other network models may be developed. The network model 316 is comprised of a series of network elements. Although, it will be appreciated that more network elements or different network elements may be used and implemented for a particular type of simulator network, developing network, or developed network.

The network model 316 of FIG. 3 comprises phone sets 318-326, switches, such as end offices 328-334, STPs 336-342, interworking units 344-346, controllable ATM matrixes 348-350, an ATM network 352 comprising ATM communication devices, signaling interfaces 354-355, call processors 356-357, a CPCS 358, and other communication devices 359-360. It will be appreciated that other communication devices may be connected to one or more of the network elements or added to the network model 316.

Between the network elements are a series of connections and links. Connections are used to transport user communications and other device information between communication devices and network elements and between the network elements and devices of the system. The term "connection" as used herein means the transmission media used to carry user communications between network elements. For example, a connection could carry a user's voice, computer data, or other communications device or network element data. Links are used to transport call signaling and control messages. The term "link" as used herein means of transmission media used to carry call signaling and control messages. For example, a link would carry call signaling or device control messages containing device instructions or data.

The network model 316 of FIG. 3 has links 361-364 between the end offices 328-334 and the STPs 336 and 342, links 365-367 between the STPs 336-342, links 368-369 between the STPs 338-340 and the signaling interfaces 354-355, links 372-373 between the call processors 356-357 and the CPCS 358, links 374-375 between the call processors and the communication devices 359-360, links 376-377 between the call processors and the interworking units 344-346, and links 378-379 between the call processors and the controllable ATM matrixes 348-350. In addition, there are connections 380-383 between the phone sets 318-326 and the end offices 328-334, connections 384-387 between the switches 328-334 and the interworking units 344-346, connections 388-389 between the communication devices 358-360 and the interworking units, connections 390-391 between the communication devices and the controllable ATM matrixes 348-350, connection 392-393 between the interworking units and the controllable ATM matrixes, and connections 394-395 between the controllable ATM matrixes and the ATM network 352.

The phone sets 318-326 may be telephones, computers, private branch exchanges (PBXs), or other devices, which may initiate, handle, or receive calls. When a user selects one of the phone sets 318-326, a window is opened which prompts the user to enter a phone number in order to place a call on the network.

The end offices 328-334 are switches or other computer devices that handle calls. Typically, the end offices 328-334 are SS7-type or C7-type switches. However, other switches or communication devices may be implemented.

The STPs 336-342 accept call signaling and transport it to the required destination. As illustrated in the network model 316, multiple STPs 336-342 are used to route call signaling within the network.

The interworking units 344 and 346 are network elements that interwork traffic between various protocols. Preferably, the interworking units 344 and 346 interwork traffic between ATM and non-ATM, such as time division multiplex (TDM) traffic. The interworking units 344 and 346 operate in accordance with control messages received from the call processors 356 and 357, respectively. These control messages typically are provided on a call-by-call basis and typically identify an assignment between a digital signal level zero (DS0) and a virtual path/virtual channel (VP/VC) for which user communications are interworked.

The controllable ATM matrixes 348 and 350 establish connections in response to control messages received from the call processors 356 and 357, respectively. The controllable ATM matrixes 348 and 350 typically connect ATM connections to other ATM connections in response to the control messages.

The ATM network 352 may comprise any type of ATM communication device. For example, the ATM network 352 comprises ATM cross connects, ATM gateways, or other ATM communication devices.

The signaling interfaces 354 and 355 receive, process, and transmit call signaling. The signaling interfaces 354 and 355 can obtain information from, and transmit information to, a communication device. Such information may be transferred, for example, as a transaction capability application part (TCAP) message, or as other SS7 messages. Signaling interfaces 354 and 355 also pass information to the call processors 356 and 357 for processing and pass information from the call processors to other communication devices.

The call processors 356 and 357 are signaling platforms that can receive and process call signaling. The call processors 356 and 357 have routing engines with data tables which have call connection data and which are used to process the call signaling. Based on the processed call signaling, the call processors 356 and 357 select processing options, services, resources, or connections for the user communications and generate and transmit control messages that identify the communication device, processing option, service, resource, or connection for the user communications.

The CPCS 358 is a management and administration system. The CPCS 358 is the user interface and external systems interface into the call processors 356 and 357. The CPCS 358 serves as a collection point for call-associated data, such as call processing and call routing data, logs, operational measurement data, alarms, statistical information, accounting information, and other call data. The CPCS 358 accepts call processing data, such as translations from operation systems, which is formatted for the routing engine tables and updates data in the routing engine tables in the call processors 356 and 357.

The communication devices 359 and 360 comprise customer premises equipment (CPE), a service platform, a switch, a remote digital terminal, a cross connect, an interworking unit, a gateway, or any other device capable of initiating, handling, or terminating a call. CPE can be, for example, a telephone, a computer, a facsimile machine, or a private branch exchange. A service platform can be, for example, any enhanced computer platform that is capable of processing calls. A remote digital terminal is a device that concentrates analog twisted pairs from telephones and other like devices and converts the analog signals to a digital format known as GR-303. A gateway is a device that changes ATM cell header VP/VC identifiers. The communication devices 359 and 360 may be TDM based or ATM based.

With reference to FIGS. 2 and 3, the NDMS 202 processes messages by routing them between the NDMS GUI 204 and the network server 208. The NDMS GUI 204 processes information for the GUI portion of the system, but must request routing information and other connection-type information from the network server 208. The message processing can be divided into several categories including routing, phone sets, end offices, cut paths, and network servers.

Routing

When a network model is loaded and initialized, each of the network paths, including the links and the connections, within the model determines which network elements it can reach on either end of the path. For example, when the network model 316 is loaded and initialized, the connection 384 determines that it reaches the end office 328 and the interworking unit 344. By using this process, each connection and link determines with which network element it is associated.

When a network element is required to forward a message or command to another network element in the network model 316 the first network element checks all of its connections and/or links to determine which connection or link has a route to the destination network element. The destination network element is determined by its DPC. The first path, which may be either a link or a connection as needed, that is available to deliver the message or command is used. This is a safety mechanism to prevent the message from being sent down multiple paths.

In addition, the network model can be configured so that each network path, including each link and each connection, determines which network elements in the network model it can reach by determining the destination points of each network element and whether the network path can reach the destination point, either directly or indirectly. For example, the link 361 determines that it can reach the destination point for the end office 332. This occurs during initialization when the link 361 determines that it can link to the link 365 to reach the STP 338, link to the link 366 to reach the STP 340, link to the link 367 to reach the STP 342, and link to the link 363 to reach the end office 332. Similarly, the link 361 determines that it can reach the point code for the call processor 356 because it can link to the STP 336, link through the link 365 to the STP 338, link through the link 368 to reach the signaling interface 354, and link through the link 370 to reach the call processor.

In this manner, the link 361 determines that it can reach the destination points for the STPs 336-342, the end offices 328-334, the signaling interfaces 354-355, and the call processors 356-357. Each link in the network model follows the same procedure to determine which destination points it can reach.

Similarly, the system can be configured so that the connections follow the same procedure to determine which destination points it can reach. For example, the connection 380 determines it can reach the destination point for the end office 328, connect through the connection 384 to reach the interworking unit 344, connect to through the connection 392 to reach the controllable ATM matrix 348, connect through the connection 394 to reach the ATM network 352, connect through the connection 395 to reach the controllable ATM matrix 350, connect through the connection 393 to reach the interworking unit 346, connect through the connection 386 to reach the end office 332, and connect through the connection 382 to reach the phone set 324.

In this manner, the connection 380 determines that it can reach the destination points for the phone sets 318-326, the end offices 328-334, the interworking units 344-346, the controllable ATM matrixes 348-350, and the ATM network 352. Each connection in the network model follows the same procedure to determine which destination points it can reach.

However, preferably the connections are cut and released in response to messages from the network elements. For example, the end office 328 would use the connection 384 to cut through to or to release the interworking unit 334.

Each of the network paths dynamically determines which destination points it can reach upon initialization. Thus, a developer does not need to build routing tables for the network since the network provides its own routing structure when initialized. This routing structure that is stored in each of the network paths, and the dynamic building of the routing structure, forms the intelligent routing engine (IRE).

The model network can be configured so that during the actual routing of the call signaling over a link or the user communications over a connection, the IRE and each network path sequentially determines whether it can reach the destination point. For example, the end office 361 may transmit call signaling destined for the call processor 356. The end office 328 initiates the call signaling. The link 361 determines that it can reach the call processor 356, so the link transmits the call signaling to the STP 336. The link 365 then determines that it can reach the call processor 456, so the link transmits the call signaling to the STP 338.

Next, each of the links 366 and 368 determine if they can reach the call processor 356. The link 366 determines that it cannot reach the call processor 356 and does not transmit the call signaling. However, the link 368 determines that it can reach the destination point for the call processor 356, so the link transmits the call signaling to the signaling interface 354. Next, the link 370 determines that it can reach the call processor 356, so the link transmits the call signaling to the call processor. Thus, in the present example, each link iteratively determines whether or not it can handle the call signaling so that the call signaling can be transmitted to the correct destination point. This all occurs sequentially. The connections can be configured to implement the same iterative determination by using the IRE.

Phone Sets

Once the network model 316 has been created, each of the network elements is initialized. A phone set, such as the phone set 318, can be attached to only a single end office, such as the end office 328. After a network model 316 is loaded, each phone set notifies its end office of its phone number so that the end office can create a listing for the phone set in the end office's phone directory.

When a user selects a particular phone set in the network model 316, a window opens that requests the user to input a phone number. When a number is dialed, the phone set sends a message to the end office to set up the call, and a path is cut between the end office and the phone set. When a call is released, the phone set sends a message to its end office to tear down the call and release the path. Although, it will be appreciated that in a real network the end office would detect the connection being dropped and would release the call.

On the terminating side of the call, when the receiving end office receives an IAM for an incoming call, the receiving end office rings the destination phone set. In addition, when a release message (REL) for the call comes into the receiving end office, the receiving end office releases the path between it and the destination phone set.

End Office

An end office is associated with a single out of network switch or call processor. When a network model is loaded, the end office transmits its phone directory to the network server 208 where the phone directory is stored with the associated out of network switch or call processor. This constitutes the global phone directory that is used by each out of the network switch or call processor in the network server 208.

In addition, when an end office initiates a call with an IAM message, the end office reserves a CIC for the call. The CIC is used for all subsequent messages to ensure that the destination end office can reply to the calling party. If a receiving end office receives an IAM for a phone set that already has a CIC assigned to the phone set, the phone set will have a status of busy, and a REL with a cause value of busy is sent back to the originating end office as the reply.

When a model is implemented as a development network, if an originating end office is to send an IAM, the originating end office performs a lookup in its phone directory to determine if there is a receiving end office with service to the dialed number. If the receiving end office has service to the dialed number, the message is forwarded to the receiving end office. Otherwise the originating end office determines the DPC of another end office that can handle the call and forwards the message to that other end office. In both cases the originating end office reserves a circuit for the call and associates the circuit with the originating point code (OPC) of the circuit. When a message is received on that circuit, the receiving end office can easily determine the DPC by way of association. When a release complete (RLC) message is received, the circuit is set to an idle state and can be reused for another call.

When the model is implemented as a simulator network or as a developed network, the routing engine in the external system 212 handles all routing tasks and circuit reservations. The simulator routing engine in the external system 212 does not rely on the global phone directory that is resident in the network server 208.

Cut Path

In addition to the connections and links that exist between the network elements, internal connections within a network element exist. For example, internal connections exist within the controllable ATM matrix 348 in which an incoming connection is connected to an outgoing connection. When a network element cuts an internal path, it is responsible for sending a cut message to each of the network elements that make up its internal path.

When a model is loaded, the paths that may be cut between the OPCs and the DPCs are loaded into a table referred to as the cut path table. These cut paths define how to cut a path through the network. If no cut paths are defined, the network server 208 determines which path to cut or release and when the path is to be cut or released. The network server 208 informs the NDMS GUI 204 of the particulars of the cut paths.

Network Server

When a network element on the NDMS GUI 204 receives a message from another network element and the receiving network element is the destination point, the receiving network element sends a message to the network server 208 requesting the NetworkServer to handle the message. If the network server 208 is available to handle the message, the network server determines where the next destination point is and performs any actions necessary for the routing and processing of the message. The network server 208 then transmits a message back to the receiving network element for the NDMS GUI 204 with the next destination point. The receiving network element on the NDMS GUI 204 then forwards the message to the next network element. The process repeats until a path is cut for the call connection.

The network server 208 has a global phone directory that is loaded to the network server 208 from each end office. The global phone directory is a list of destination points for each particular network element. By using the global phone directory, the network server 208 can determine any of the required connections or links to a next network element.

It will be appreciated that the network server 208 communicates with a call processor in the external system, whether it is a simulator or a live switch or routing engine, for the determination of the actual selection of the connections. Thus, the switch or routing engine in the external system 212 makes the determinations of the connection for the call cut through and transmits that information through a command or message to the network server 208. The network server 208 then uses this information to select the next destination point and the next network element on the NDMS GUI 204.

Thus, when the network server 208 receives a message, it determines the external switch to which the message is to be transmitted and hands the message over to the external switch for processing. However, before the network server 208 transmits the message to the external switch in the external system 212, the NetworkServer must determine that the external switch can handle the message. The network server 208 determines this availability by looking for an external switch with a point code equal to the DPC of the message.

Operation

The system of FIGS. 2 and 3 operates as follows. In one example, a user may select a first phone set 318 and open a window in which the user can input a phone number that corresponds to a second phone set 324.

The NDMS GUI 204 highlights the icon for the first phone set 318, the icon for the first end office 328, and the connection 380 there between. The network element for the end office 328 transmits a message to the network server 208 requesting the destination point for the next network element. The network server 208 responds to the end office 328 with the destination point of the STP 336.

The first end office 328 builds an LAM and transmits the IAM to the STP 336. This transmission is illustrated on the GUI 302 by NDMS GUI 204 highlighting the link 361 with the corresponding IAM designation and then the icon for the STP 336.

The link 361 is highlighted only for a specified period of time so that the user can see the messages move through the network on the GUI 302. In addition, a delay is imposed on the processing of the call signaling and the path cut through to allow the user to see the messages move through the network in sequence or to see a path cut through for each connection in sequence. Similarly, each network element, link and connection is highlighted in the corresponding manner.

The STP 336 likewise determines, through a request message to the network server 208, that the STP 338 is the next destination point. The STP 336 transmits the IAM to the STP 338 over the link 365. Thus, the NDMS GUI 204 highlights the link 365 with the corresponding IAM designation followed by the STP 338.

As before, the STP 338, through a request to the network server 208, determines that the next destination point is the signaling interface 354. The STP 338 transmits the IAM to the signaling interface 354 over the link 368. At this point, the NDMS GUI 204 highlights the link 368 with the corresponding IAM designation followed by the icon for the signaling interface 354.

The network element for the signaling interface 354 transmits a control message to the network server 208 requesting the destination point of the next network element. The network server 208 transmits a control message to the corresponding signaling interface in the external system 212. At the same time, the network server 208 transmits a message back to the requesting signaling interface 354 designating the call processor as the next destination. The NDMS GUI 204 then highlights on the GUI 302 the links 370 with the corresponding IAM designation followed by the icon for the call processor 356.

At this point, the signaling interface in the external system 212 processes the particular call signaling and transmits the particular call signaling information to the call processor in the external system. The call processor in the external system 212 processes the call signaling information and transmits the results back through the signaling interface to the network server 208. These results include SS7 data with which the network server 208 can determine the next destination point.

This procedure occurs for several destination points so that the IAM is transferred over the link 370, to the signaling interface 354, back through the link 368, and to the STP 338. Following the above-described procedure, the IAM then will be transmitted over the link 366 to the STP 340 and over the link 369 to the signaling interface 355. The NDMS GUI 204 will highlight the link 366 with the IAM designation, the STP 340, the link 369 with the IAM designation, and the signaling interface 355 icon, in sequence, as the IAM travels between the network elements. In this manner the user can follow the IAM as it travels over the particular links and to the particular network elements in the network model 316.

As with the first signaling interface 354 and the first call processor 356, the network server 208 will transmit a control message in the form of an SS7-type message to the real corresponding signaling interface in the external system 212. The signaling interface in the external system 212 will then transfer the required call signaling information to the call processor in the external system for processing. After the call processor in the external system 212 processes the call signaling information, the call processor will respond to the signaling interface that will in turn transmit a message to the network server 208. With the information identified by the call processor and the signaling interface in the external system 212, the network server 208 can determine the next destination network elements in the network model 316.

As with the transmission of the IAM described above, the IAM will be transmitted from the call processor 357 over the link 371 to the signaling interface 355. The NDMS GUI 204 will then highlight, in sequence, the network elements and links as the IAM is transmitted. Therefore, the link 371 will be highlighted with the IAM designation followed by the icon for the signaling interface 355.

As illustrated above, the network server 208 will continue to communicate with the NDMS GUI 204 to determine the next destination points for the network elements and to display that information to the user. Thus, the IAM will be transmitted over the link 369 to the STP 340, over the link 367 to the STP 342, and over the link 363 to the end office 332. As the IAM is transmitted between the network elements, the links and network elements will be highlighted in sequence. Thus, the link 369 will be highlighted with the IAM designation, followed by the icon for the STP 340. Then, the link 367 will be highlighted with the IAM designation, followed by the icon for the STP 342, followed by the link 363 with the IAM designation, and ultimately to the icon for the end office 332. In this manner, the user is able to follow the transmission of the IAM through each link and each network element in sequence.

The network element on the NDMS GUI 204 that represents the end office 332 determines that the phone set 324 is available and not busy. The end office 332 then rings the phone set 324 and reserves an available circuit.

The end office 332 transmits an address complete message (ACM) back over the link 363 to the STP 342. The ACM then is transmitted over the series of links in the reverse order of the IAM and ultimately is transmitted to the signaling interface 355. Thus, by using the above referenced procedure as identified with the IAM, the link 363 is highlighted with a corresponding ACM message identified on the GUI 302 to the user. Likewise, the STP 342 is highlighted, the link 367 is highlighted with the ACM designation, the icon for the STP 340 is highlighted, the link 369 is highlighted with the corresponding ACM designation, and the icon for the signaling interface 355 is highlighted.

As with the IAM, the network server 208 transmits the ACM to the signaling interface in the external system 212. The signaling interface in the external system 212 removes the header information and transmits the requisite SS7 information to the call processor in the external system 212. The call processor in the external system 212 processes the address complete information mad transmits call signaling back to the signaling interface which is then sent to the network server 208. The network server 208 now has the information required to allow it to determine which network element is the next destination.

Through the communication of commands and messages between the network server 208 and the NDMS GUI 204, the above process is continued so that the ACM is transmitted over the link 369 with its corresponding ACM to the STP 340. The ACM then is transmitted over the link 366 to the STP 338 and over the link 368 to the signaling interface 354. As the ACM is transmitted between the network elements, this ACM designation is displayed on the GUI 302, in sequence, so that the user can identify that the ACM is transmitted between the network elements. Thus, the link 369 is highlighted along with a corresponding ACM designation, the icon for the STP 340 is highlighted, the link 366 is highlighted with the corresponding ACM designation, the icon for the STP 338 is highlighted, the link 368 is highlighted with the corresponding ACM designation, and then the icon for the signaling interface 354 is highlighted.

As with the prior signaling interface 355 and call processor 357, when the SS7 message is to be processed by the signaling interface 354 and the call processor 356, the network server 208 transmits a command message to the signaling interface in the external system 212. The signaling interface in the external system 212 processes the information and transmits the remaining SS7 type information to the call processor in the external system 212 for processing. The call processor in the external system 212 processes the information and then transmits the requisite response back to the signaling interface in the external system 212 which forwards a control message back to the network server 208.

Since the network server 208 now has the information available to determine the next destination network elements, processing of the SS7 message can continue. Through the process described above in which the network server 208 and the NDMS GUI 204 communicate to identify network elements, the path of the ACM can be traced through the rest of the network elements.

Thus, the ACM is transmitted from the signaling interface over the link 368 to the STP 338, over the link 365 to the STP 366, and over the link 361 to the end office 328. As the ACM is being transmitted through the network elements, the NDMS GUI 204 provides that the links and network elements are highlighted to follow the sequence of the transmission of the ACM. Thus, the link 368 is highlighted with the corresponding ACM designation, the icon for the STP 338 is highlighted, the link 365 is highlighted with the corresponding ACM designation, the icon for the STP 336 is highlighted, the link 361 is highlighted with the corresponding ACM designation, and the icon for the end office 328 is highlighted.

While the ACM is being transmitted between the network elements, the end office 332 initiates an answer message (ANM) when the user answers the phone set. The transmission and processing of the ANM follows the above procedure. Thus, the ANM ultimately is transferred from the end office 332 to the call processor 357, back up the links to the call processor 356, and to the end office 328.

When the network server 208 transmits an ANM to the signaling interface in the external system 212, the signaling interface in the external system processes the ANM and transmits the requisite ANM-type information to the call processor in the external system. The call processor in the external system 212 processes the information and determines if cut through is available.

It will be appreciated that when the IAM was processed by the respective call processors 356 and 357, connections had been determined that would allow the call to be connected through the respective network elements. Thus, when the ANM is received by the call processors 356 and 357, the respective call processors specify to the call connecting network elements that a call can be cut through.

Therefore, the call processor in the external system 212 transmits a control message to the interworking unit and the controllable ATM matrix identifying the connections for which to make a call. The corresponding interworking unit and the controllable ATM matrix in the external system 212 make the connections. The call processor in the external system 212 transmits the requisite SS7 information for the ANM to the signaling interface in the external system which is in turn transmitted to the network server 208.

The network server 208 can then work with the NDMS GUI 204 in determining which particular connections have been made for path cut through. Through information received by commands from the network server 208, the NDMS GUI 204 will highlight the icon for the controllable ATM matrix 350, the connection 393, the icon for the interworking unit 346, and the connection 386 to the end office 332.

In a similar manner, the ANM is transmitted from the signaling interface 355 over the network elements and links to the signaling interface 354. Likewise, the NDMS GUI 204 will instruct the network elements and links to be highlighted. Thus, the transmitted ANM will be displayed to the user, in sequence, as the link 369 is highlighted with the corresponding ANM designation, the icon for the STP 340 is highlighted, the link 366 is highlighted with the corresponding ANM designation, the STP 338 is highlighted, the link 368 is highlighted with the corresponding ANM designation, and the icon for the signaling interface 354 is highlighted.

Once the call processor in the external system 212 has determined availability for cut through, it will transmit control messages to the interworking unit 344 and the controllable matrix 348. This will allow cut through to occur.

The network server 208 follows the same procedure as identified above for the signaling interface and the call processor that correspond to the signaling interface 354 and the call processor 356. The network server 208 transmits the ANM to the signaling interface in the external system 212. The signaling interface then transmits the requisite ANM information to the call processor in the external system 212.

The call processor in external system 212 processes the information to determine path cut through availability, and transmits the ANM information back to the signaling interface of the external system. The signaling interface in the external system 212 transmits the ANM back to the network server 208. The network server 208 then has the requisite information available to determine the next destination network element.

In a manner similar to the above, the ANM is transmitted over the link 368 to the STP 338, over the link 365 to the STP 336, and over the link 361 to the end office 328. Thus, through the communications between the network server 208 and the NDMS GUI 204, the sequence of the transmission will be communicated to the user via the GUI 302.

In addition, the network server 208 can determine that path cut through has occurred and will instruct the NDMS GUI 204 as to the next destinations. The NDMS GUI 204 highlights the interworking unit 344, the connection 392, the icon for the controllable ATM matrix 348, the connection 394, the icon for the ATM network 352, and the connection 395. Also, the link 368 will be highlighted with the corresponding ANM designation, the STP 338 will be highlighted the link 365 will be highlighted with the corresponding ANM designation, the icon for the STP 336 will be highlighted, the link 361 will be highlighted with the designation for the ANM, and the ANM will reach the originating end office 328.

Once the end office 328 has determined it received the ANM, path cut through for the call communication can occur. The end office 328 transmits a message to the network server 208 requesting path cut through. The network server 208 transmits a message back to the end office 328 providing for the path cut through, and the NDMS GUI 204 will highlight the connection 384. Thus, path cut through has occurred.

It will be appreciated that a release message (REL) and a release complete message (RLC) can be transmitted through the network model 316 in the same manner. A release can occur from either side of the call connection. Thus, a release can be initiated from either the end office 328 or the end office 332. If the release is initiated by the end office 332 through an on-hook provided by the phone set 324, and the connection 382 is dropped. The phone set 324 and the connection 382 are returned to the normal non-highlighted state.

The release will be processed by the call processor 357 network element and the associated call processor in the external system 212. The connections 393 and 386 first will be dropped. Corresponding to this process, the highlighted portions for the connection 393, the interworking unit 346, and the connection 386 will be deselected and thus not highlighted. The user then will see a release complete message (RLC) being transmitted from the call processor 357 to the end office 332.

At the same time the REL will have been transmitted from the call processor 357 through the network elements to the call processor 356. The network server 208 will transmit the REL information through the signaling interface and to the call processor in the external system 212. The call processor in the external system 212 will identify the release and specify to its call connecting elements that the connections are to be dropped. Thus, the interworking unit and the controllable ATM matrix will drop their connections.

As the network server 208 receives this information and communicates with the NDMS GUI 204, the respective icons and the connection will be deselected and de-highlighted. Therefore, the icon for the interworking unit 344, the connection 392, the icon for the controllable ATM matrix 348, the connection 394, the icon for the ATM network 352, the connection 395, and the icon for the controllable ATM matrix 350 will all be deselected and de-highlighted.

As with the above-identified procedure, the REL will be transmitted from the call processor 356 to the end office 328. When the end office 328 receives the REL, the NDMS GUI 204 will instruct the network elements on the GUI to deselect and de-highlight the respective icons and connections. Therefore, the link 384, the icon for the end office 328, the link 380, and the icon for the phone set 318 will all be deselected and de-highlighted.

It will be appreciated that any SS7 message can be displayed as traveling though the network model 316 in the above-identified manner. In this way the NDMS GUI 204 graphically displays the sequence in which SS7 messages are transmitted among the network elements in the network model 316. In addition, the NDMS GUI 204 graphically displays how each of these SS7 messages are processed by the particular network elements and how the results of the processing of the SS7 messages affect the network elements and the connections associated with the network elements. The NDMS GUI 204 is not limited to showing a single call at a time. Multiple calls may occur at the same time.

Also, it will be appreciated that network models other than SS7 systems may be developed with the present invention. For example, a C7 network may be developed. In addition, any type of public or private network may be developed with the present invention, including wide area networks (WANs) and virtual private networks (VPNs).

In addition, the practitioner will understand that when call signaling is transmitted between a signaling interface and a call processor, not the whole of the message is transmitted in this particular embodiment. For example, the call signaling is received by the signaling interface in an external system at which point the signaling interface strips the header and other information which is not required for call processing. The call processor receives from the signaling interface only those information elements that are needed for call processing. Even though the NDMS GUI 204 displays the name of the call signaling message, such as an IAM, as being transmitted from a signaling interface to a call processor, the practitioner will understand that this is representative of the underlying call signaling data for that particular message without the header and other stripped information.

NDMS Objects

FIGS. 4 through 8 illustrate exemplary embodiments of objects associated with the present invention. These objects represent an object-oriented type programming system that uses the well-known unified modeling language (UML) notation. Therefore, the arrowheads designate aggregation and navigability. A closed arrowhead on an arrow from a first object to a second object means that the first object is a subclass of the second object to which it points. An open arrowhead on an arrow from a first class to a second class means that the first object is dependent on the second object. Thus, an open arrow illustrates dependency and association between the first object and the second object to which it points.

A diamond on the line represents aggregation by value or by reference. An open and not filled in diamond on a line from a first object to a second object represents that the first object is referenced by the second object. If a diamond is solid and filled in on a line between a first object and a second object, the first object is contained by, and is a part of, the second object.

A circle that is filled in and which has a designation listed next to it is an interface. A line between an object and an interface that does not have dependency or association means that the object implements the interface. A circle with a letter in it means that the aggregation or dependency is by another object that is on another Figure with that same alpha designation in the corresponding circle. In addition, certain objects identified in the following Figures are components available in the Java programming language. Some of the objects are identifiable as having a J in front of the object name. Java is a programming language owned by Sun Microsystems, Inc.

FIG. 4 illustrates an exemplary embodiment of applications and libraries of the present invention. In the embodiment of FIG. 4, the NDMS software 402 comprises an NDMSGUI 404, a NetworkProxy 406, NetworkServer 408, a DevelopmentNetwork 410, a SimulatorNetwork 412, and a Slide 414. The NDMSGUI 404, the DevelopmentNetwork 410, and the SimulatorNetwork 412 are applications. The NetworkProxy 406, the NetworkServer 408, and the Slide 414 are libraries. The arrows shown between any two objects of FIG. 4 represent the dependency between the object applications and object libraries. It will be appreciated that the DevelopmentNetwork 410 and the SimulatorNetwork 412 are specific implementations of the NetworkServer 408. It is not necessary to have either or both of the DevelopmentNetwork 410 or the SimulatorNetwork 412. However, for purposes of illustration and for demonstrating the benefit and novelty of the present invention, the specific implementations of the DevelopmentNetwork 410 and the SimulatorNetwork 412 will be illustrated.

The NDMSGUI 404 is the package of objects that implements the GUI front end for the NetworkServer 408. The NDMSGUI 404 implements the procedures in which the user may build network models, implement test calls, configure networks, edit muting engine tables, and route, trace, and debug an SS7 messaging network.

The Network-Proxy 406 is a library that contains a proxy to the NetworkServer 408 and all of the support classes required by the NetworkServer 408. The NetworkProxy 406 provides the means in which messages are communicated between the NDMSGUI 404 and the NetworkServer 408 and between the NDMSGUI 404 and each of the DevelopmentNetwork 410 and the SimulatorNetwork 412.

The NetworkServer 408 provides the basic framework for particular implementations of network models. By extending the classes in the NetworkServer 408, the developer may develop multiple simulator networks, developing networks, or interfaces to developed networks which may be configured and viewed through the NDMSGUI 404.

The DevelopmentNetwork 410 implements a routing model for testing new networks. The DevelopmentNetwork 410 is an implementation of the NetworkServer 408.

The SimulatorNetwork 412 implements switches that use a simulator for processing call signaling with the routing engine. The SimulatorNetwork 412 is an implementation of the NetworkServer 408.

The Slide 414 is a library that contains reusable GUI components. For example, the Slide 414 contains classes needed for building an action area for a window. It also includes login, form layout, and authentication classes.

FIGS. 5A-5F illustrate an exemplary embodiment of an NDMSGUI 500 class diagram. The exemplary objects work in conjunction to provide the GUI.

Figure 5A:
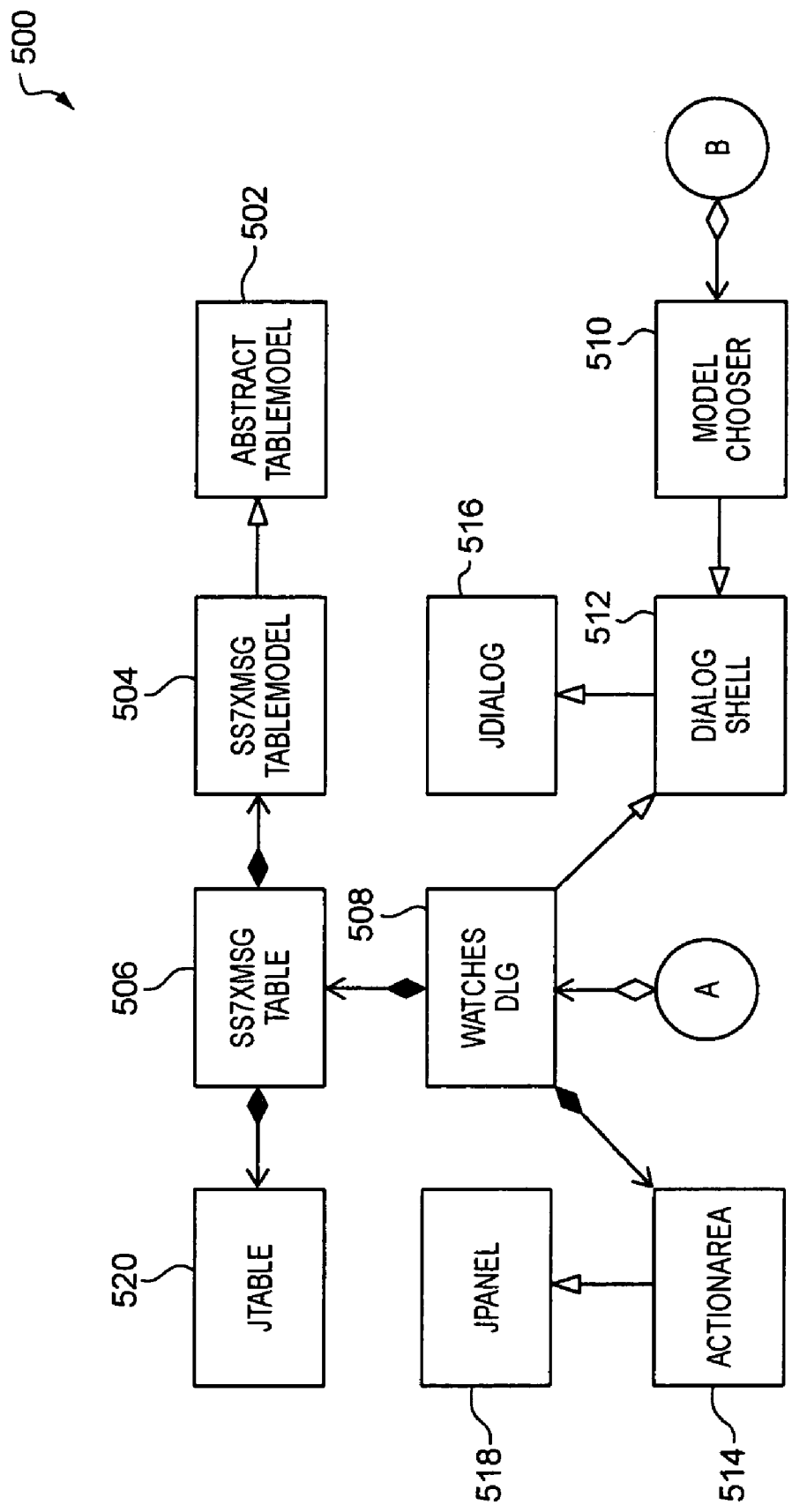
FIG. 5A is a block diagram of a network development, management, and/or monitoring system in accordance with an embodiment of the present invention.

The NDMSGUI 500 of FIG. 5A includes an AbstractTableModel 502, an SS7XMsgTableModel 504, an SS7XMsgTable 506, a WatcherDlg 508, and a ModelChooser 510. The NDMSGUI 500 further includes a DialogShell 512, an ActionArea 514, a JDialog 516, a JPanel 518, and a JTable 520.

The AbstractTableModet 502 provides default implementations for the methods for the table model interfaces. The AbstractTableModel 502 provides for management of listener objects and methods and provides for generating TableModelEvents and dispatching them to the listener objects.

The SS7XMsgTableModel 504 extends the AbstractTableModel 502 to implement a data model for the SS7XMsgTable 506. The data model stores all of the SS7 messages as well as the vector of the visual items.

The SS7MsgTable 506 is a binder class that instantiates a JTable 520 and an SS7XMsgTableModel 504. The SS7XMsgTable 506 provides for different implementations of the SS7XMsgTable so that when a view of an extended SS7Msg is needed, different tables can be developed and instantiated. The SS7XMsgTableModel 504 extends the AbstractTableModel 502.

The WatchesDlg 508 presents the current SS7 messages that are present in the network model when a user is debugging the network model, including an IAM, an ACM, an ANM, a REL, and an RLC. The user has the ability to examine each packet of SS7 data as it moves through the network model. The fields of the SS7 message are stored in a hash table that is keyed by a field code and that is used in conjunction with the meta-data that is present for the SS7 extended message. The SS7 extended message includes the data from the SS7 message as well as additional information including the previous point code, the next point, the icon display color, and other information used by a network element in the NDMS GUI 204. (See FIG. 2.) The WatchesDlg 508 extends the DialogShell 512.

The ModelChooser 510 obtains the list of available network models from the NetworkProxy 406 (see FIG. 4). The list of available network models is contained on the NetworkServer 408. The model names are loaded into the JTable 520. The ModelChooser 510 extends the DialogShell 512.

The DiaiogShell 512 extends the JDialog 516 to add a busy method and a dialog placement method. In addition, the DialogShell 512 adds a method that ensures other methods are not invoked until the window is closed.

The ActionArea 514 builds an action area for a dialog or main window. The ActionArea 514 is a JPanel 518 that contains a row of push buttons and has a top separator between it and the rest of the dialog.

The JDialog 516 provides for creating a dialog window. The JDialog 516 is used to create a custom dialog or to invoke static methods to create a variety of standard dialogs. The JDialog 516 extends the dialog object.

The JPanel 518 is a generic container. The JPanel 518 extends the Java class object called JComponent.

The JTable 520 is a user interface component that presents data in a two dimensional table format. The JTable 520 makes provisions for customizing its rendering and editing, and it provides defaults for these features.

Figure 5B:
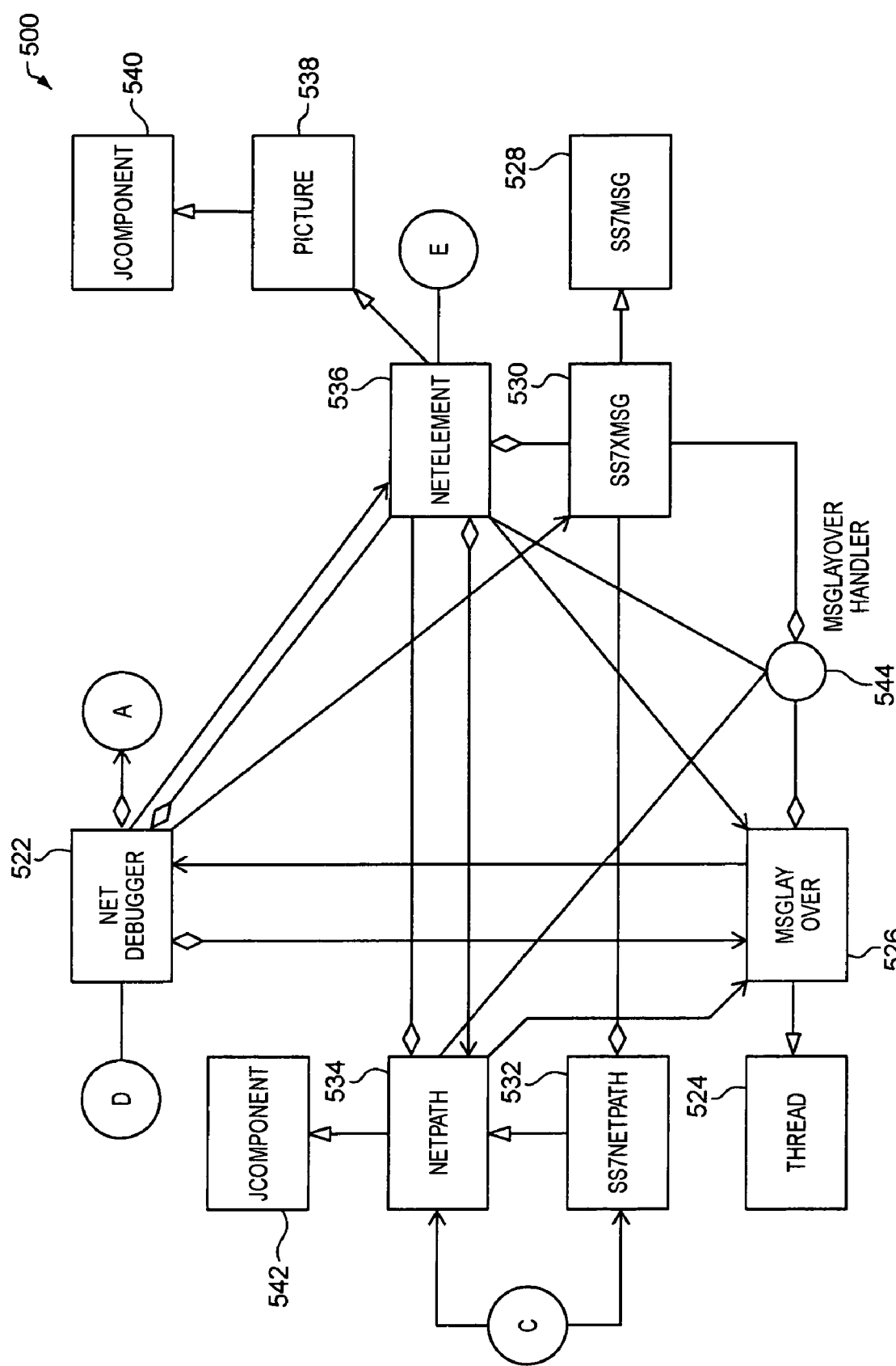
FIG. 5B is a continuation of the network development, management and/or monitoring system of FIG. 5A.

FIG. 5B is a continuation of FIG. 5A for an exemplary embodiment of an NDMSGUI 500 object. The objects and interfaces of FIG. 5B include a NetDebugger 522, a Thread 524, a MsgLayOver 526, an SS7Msg 528, an SS7XMsg 530, an SS7NetPath 532, a NetPath 534, and a NetElemant 536. The objects and actions further include a Picture 538, a JComponent 540, a JComponent 542, and a MsgLayOverHandler 544.

The NetDebugger 522 shows the user which messages are being processed, allows the user to see which break points are being set, allows the user to step through the network model, and provides for the procedures which the user can implement through the SS7 editor and the SS7 debugger. The NetDebugger 522 is a utility class in that all of its members and methods are static. The NetDebugger 522 methods create the WatchesDlg 508 in an associated dialog window as well as save a handle to the dialog window for drawing purposes. The NetDebugger 522 works with the MsgLayOver 526 to provide the debugger interface that is displayed to the user of the GUI.

The Thread 524 is a thread of execution in a program. Multiple threads of execution may be run concurrently. Multiple threads are used for the MsgLayOver 526.

The MsgLayOver 526 is a timer thread that is used by the NetPath 534 and the NetElement 536 to visually delay the illustration of the connections being made between the network elements and to allow the user to see the SS7 messages traveling over the links between the network elements. If the SS7 debugger is being run, the MsgLayOver 526 does not start the timer thread, but hands itself over to the SS7 debugger. The SS7 debugger will send the message on when the user presses a step button on the GUI or a continue button on the GUI. The MsgLayOver 526 extends the Thread 524.

The SS7Msg 528 consists of the broken down components an SS7 message. The SS7 message is encoded and decoded on the network server in order to ensure that the NDMS GUI tool does not have to understand how to handle a real SS7 message since a real SS7 message is a bit stream. When an SS7 message is constructed, the NetworkProxy 406 can be used to allow the corresponding NetworkServer 408 to initialize the message based on the real network model configuration. (See FIG. 4.)

The SS7XMsg 530 extends the SS7Msg 528 to add rendering information, such as color, and storing the next network element and the previous network element. All network elements use the SS7XMsg 530 for its extended SS7 information, while the underlying SS7Msg 528 is used to send an SS7 message to the real network server.

The SS7NetPath 532 extends the NetPath 534 in order to draw a dashed line for the SS7 network model. In addition the SS7NetPath 532 is used to show the navigation arrows when a path is used.

The NetPath 534 is used to link two NetElements 536 together. When a message is sent to the NetPath 534, the NetPath re-colors the path according to the color of the SS7XMsg and waits for a period of a MsgLayOver before changing the color back to the original color. If additional messages arrive during the MsgLayOver, they are queued and processed after the layover. The NetPath 534 also constructs navigation arrows that can be used by the SS7NetPath to show the direction of the message flow.

The NetElement 536 is a network element that can process SS7 messages. The NetElement 536 includes all network elements, such as an end office, a phone set, a call processor, and other network elements. Each network element is represented by an image and/or a label.

When a message is sent to the NetElement 536, the NetElement re-colors the path, including the link or the connection, according to the color of the SS7XMsg 530. The NetElement 536 uses a MsgLayOver 526 implementation to wait for a short delay before changing the color. However, if the SS7 debugger is active, then the NetElement 536 does not use the MsgLayOver 526 because the user will advance the message. If additional SS7 messages arise during the period in which the MsgLayOver 526 is implemented, the SS7 messages are queued by an implementation of the MsgLayOver.

The cut paths for a NetElement 536 are defined in the network model file, and each NetElement 536 contains a hash table of the cut paths to a DPC. When a NetElement 536 receives an ANM, the NetElement checks to see if it has any cut paths to the OPC, and, if so, the NetElement cuts its internal path and then the path to the OPC. Each path is defined as a series of connected network elements in the network model.

The Picture 538 combines a graphic image and/or a label string in a push button type component. The placement of the label string can be controlled independent of the image as well as other configurable options such as margin width, border width and color, spacing, and alignment.

The JComponents 540 and 542 are the base class for the Java swing components. The JComponents 540 and 542 provide keystroke handling methods, action objects, support for international localization, slow-motion graphics rendering, and dialog construction using static methods.

The MsgLayOverHandler 544 is an interface that is used by classes that implement the MsgLayOver 526 timer thread for implementing a delay so that a user can see packets of information move through the network model on the GUI. The NetPath 534 and the NetElement 536 are examples of objects that implement this interface.

Figure 5C:
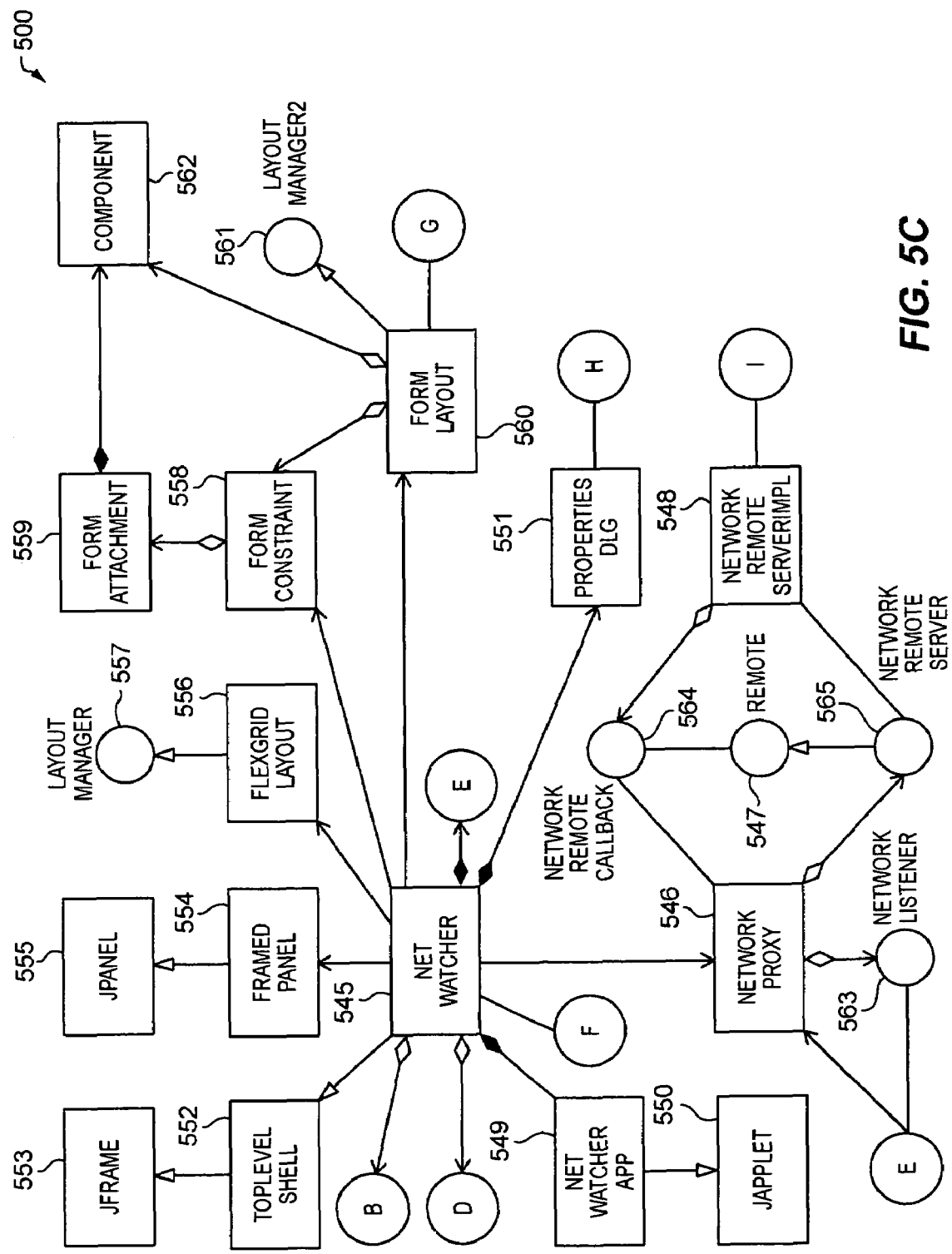
FIG. 5C is a continuation of the network development, management, and/or monitoring system of FIG. 5A.

FIG. 5C is a continuation of FIGS. 5A-5B for the exemplary embodiment of an NDMSGUI 500. The objects of the NDMSGUI 500 of FIG. 5C comprise a NetWatcher 545, a NetworkProxy 546, a Remote 547, a NetworkServerImpl 548, a NetWatcherApp 549, a JApplet 550, and a PropertiesDlg 551. The objects further include an TopLevelShell 552, a JFrame 553, a FramedPanel 554, a JPanel 555, a FlexGridLayout 556, a LayoutManager 557, a FormConstraint 558, a FormAttachment 559, a FormLayout 560, a LayoutManager2 561, and a Component 562. In addition, the NDMS GUI package includes interfaces for a NetworkListener 563, a NetworkRemoteCallback 564, and a NetworkRemoteServer 565.

The NetWatcher 545 owns all of the elements that make up the GUI. The NetWatcher 545 is responsible for creating the main window to the GUI. The NetWatcher 545 references the other objects of the NDMS GUI and communicates with objects that provide commands and messages to be sent to the Network Proxy 406 (See FIG. 4).

The NetworkProxy 546 is a proxy object for the network server, including the NetworkServer 408, the DevelopmentNetwork 410, and the SimulatorNetwork 412. By using a proxy, the NDMSGUI 500 can connect to any implementation of a NetworkServer without having to hard code the server connection.

The Remote 547 is an interface that serves to identify all remote objects. Any object that is a remote object must directly or indirectly implement this interface. Only those methods specified in a remote interface are available remotely.

The NetworkRemoteServerImpl 548 implements an instance of a NetworkServer for the NDMSGUI 500. The NetworkRemoteServerImpl 548 provides the basic processing required for different switch and call processor implementations. A different NetworkServer object is instantiated for each new client connection to handle all requests for that client.

The NetWatcherApp 549 starts the NetWatcher 545 and the NMDSGUI 500 as an applet. Alternatively, the NetWatcherApp 549 can start the NetWatcher 545 and the NDMSGUI 500 as a program by instantiating the NetWatcher 545.

The JApplet 550 is an extended version of a Java applet and adds support for interposing input and painting behavior in front of the applet's children, such as GlassPane. In addition, the JApplet 550 provides support for children objects that are managed by a LayeredPane and for Swing MenuBars.

The PropertiesDlg 551 allows the user to select a network model to which it would like to connect. In addition, the PropertiesDlg 551 allows an end user to select the NetworkProxy and the layover delay that occurs between the selection and sending of SS7 messages.

The TopLevelShell 552 extends the JFrame 553 in order to add an application busyness management, cursor control, and proper shut down of an application or an applet. The busy model is based on a SwitchBoard object and works in concert with a DialogShell. All DialogShells should exist in the same thread as in the TopLevelShell 552. Otherwise, the TopLevelShell 552 will show that they are busy even if they are not.

The JFrame 553 is a Java class that adds support for interposing input and painting behavior for the children objects of frames, such as GlassPane. In addition, the JFrame 553 provides support for children objects that are managed by a LayeredPane and for Swing MenuBars.

The FramedPanel 554 is a panel that supports a border and a specified margin width. The FramedPanel 554 provides a tighter layout than the JPanel 555 implementation.

The JPanel 555 is a generic container. The JPanel 555 extends the JComponents.

The FlexGridLayout 556 is a layout manager that arranges its children objects in a grid. The FlexGridLayout 556 provides that a child object does not have to occupy an entire cell, and it is not constrained to occupying only a single cell. Each child component can span one or more cells in the grid or can use its preferred width and height.

The LayoutManager 557 is an interface for objects and provides for the layout of containers. The LayoutManager 557 provides the mechanism for entry to the FlexGridLayout 556.

The FormConstraint 558 stores and accesses attachment information from the FormAttachment 559 for a component, such as the Component 562, which is managed by a form LayoutManager 557. The FormConstraint 558 provides methods for attaching a component to another component in a specified position. The developer must instantiate a new FormConstraint object for each Component object that is being managed by the FormLayout 560 manager, and call the appropriate method to set the attachments. In addition to the attachment information, each FormConstraint object contains a sequence number for which it was added to the form. This number can be used by the FormLayout manager to determine when the component should be laid out. Typically, attachments to other components can only be made to components with a lower sequence number.

The FormAttachment 559 stores specific attachment information for a single side attachment. One FormAttachment 559 is used by the FormConstraint 558 for each constraint. The attachment can be for one of the four sides of the associated Component 562, such as top, bottom, left, and right. In addition, the attachment specifies how to attach to the object in a specified position.

The FormLayout 560, is a layout manager that implements a "form" style layout. This is accomplished by providing the mechanism for the forms children component objects to specify their constraints by way of attachments. The attachment information is used to initially size the form and to resize the form. The attachments can be specified for one or all of its sides, including the top, bottom, left, and right, and to another component, to the opposite side of another component, to a position on a form, and to the form itself. All attachments are offset by a vertical or a horizontal spacing factor, depending on which side is being attached, unless an offset is explicitly specified for the attachment. The spacing factors are not used when attaching to the opposite side of another component.

The LayoutManager2 561 is an interface for classes that layout containers. This interface extends the LayoutManager 557 to function with layouts in terms of constraint objects that specify how and where components should be added to the layout.

The Component 562 is an object having a graphical representation that can be displayed on a screen in a window. The Component 562 can interact with a user. Examples of components are the buttons, check boxes, NetPaths, NetElements, and scroll bars of a typical graphical user interface.

The NetworkListener 563 is an interface that is used by the NetworkProxy 546 to notify an object that the NetworkServer 408 has issued a command. (See FIG. 4.) The NetPath 534 and NetElement 536 implement this interface in order to process trace output and to cut or release a network path.

The NetworkRemoteCallback 564 is an interface that defines actions that can be invoked from a NetworkServer object implementation back to the client. This allows the implementation of the NetworkServer to send messages to the NetworkProxy that then can dispatch the messages to any object that has implemented the NetworkRemoteCallback 564 interface.

The NetworkRemoteServer 565 is an interface that defines methods that a NetworkServer has to implement in order to function as a remote network server for the NetWatcher 545. The NetworkRemoteServer 565 can asynchronously make calls to the NetWatcher 545. In addition, the NetworkRemoteServer 565 must process the SS7 messages submitted to it for the calling client and can return multiple new SS7 messages to the client.

Figure 5D:
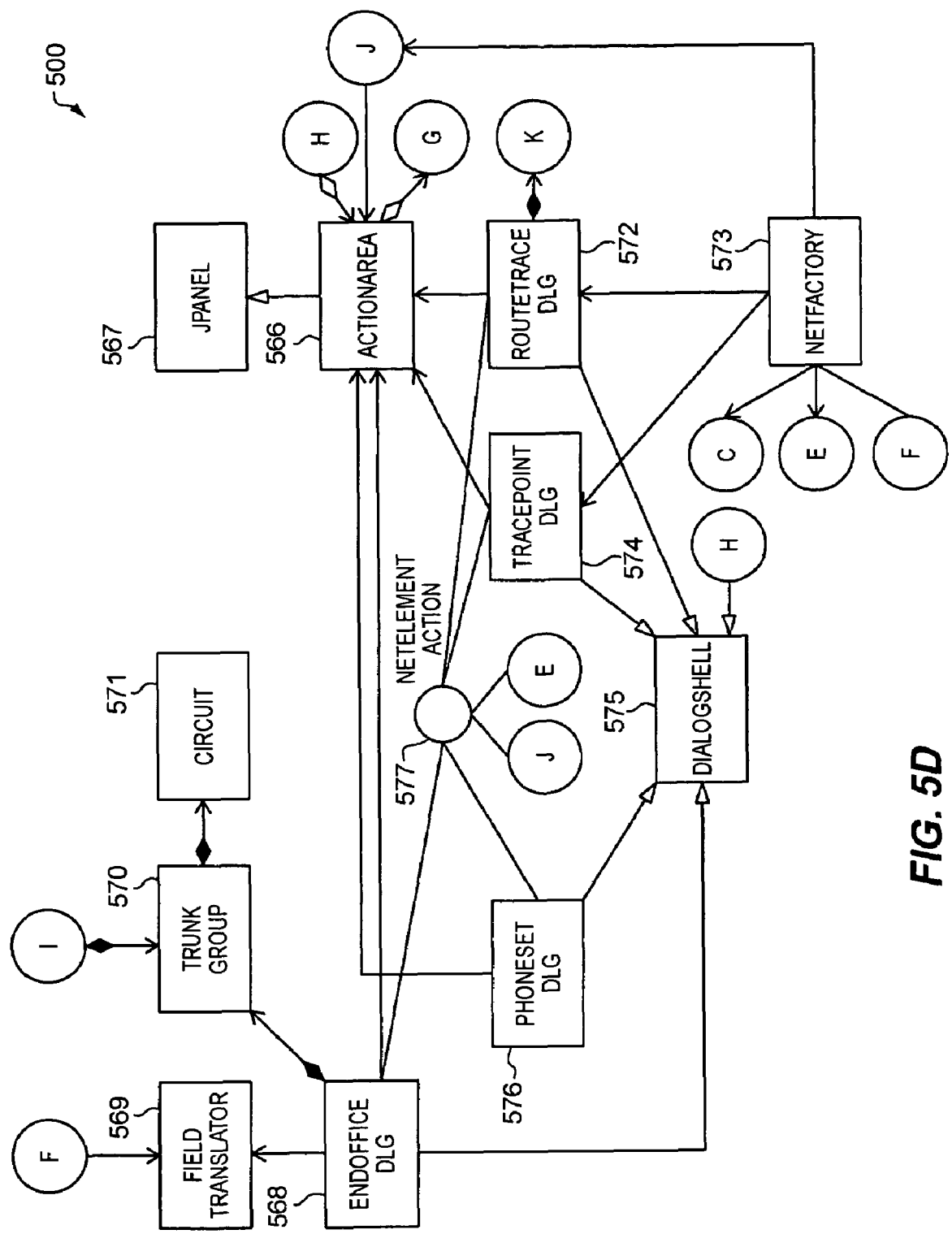
FIG. 5D is a continuation of the network development, management, and/or monitoring system of FIG. 5A.

FIG. 5D is a continuation of FIGS. 5A-5C for an exemplary embodiment of an NDMSGUI 500. The objects and interfaces of FIG. 5D comprise an ActionArea 566, a JPanel 567, an EndOfficeDlg 568, a FieldTranslator 569, a TrunkGroup 570, and a Circuit 571. The objects and interfaces of FIG. 5D further include a RouteTraceDlg 572, a NetFactory 573, a TraceDlg 574, a DialogShell 575, a. PhoneSetDlg 576, and a NetElementAction 577.

The ActionArea 566 builds an action area for a dialog or main window. The ActionArea 514 is a JPanel 51g that contains a row of push buttons and has a top separator between it and the rest of the dialog.

The JPanel 567 is a generic container. The JPanel 567 extends the Java class object called JComponent.

The EndOfficeDlg 568 creates a window that allows the user to configure an EndOffice object network element. The EndOfficeDlg 568 initiates a call setup, answers a call, and tears down a call. Each EndOffice in a network model contains a phone directory of all the PhoneSets connected to the EndOffice. When the network model has been initialized, the PhoneDirectory is published to the NetworkServer 408. (See FIG. 4.) The EndOffice also has the built-in functionality to handle in-network calls.

The FieldTranslator 569 loads the translation table for translating SS7 messages to a human-readable string that can be viewable by the user. In addition, the FieldTranslator 569 translates the SS7 messages into the human-readable strings.

The TrunkGroup 570 provides the functions to reserve and associate CICs. The TrunkGroup 570 combines the reservation and association of the CICs into an easy to use class interface.

The Circuit 571 contains the data associated with a circuit in a TrunkGroup 570. The circuit data consists of a CIC, a DPC, an idle flag, the trunk group associated with the CIC, and the DPC associated with the trunk group.

The RouteTraceDlg 572 graphically displays in a sequence diagram the routing database lookups that occur.

The NetFactory 573 reads the network model file and constructs the network model according to the layout specified in the network model file. The NetFactory 573 operates to assist in building the network model.

The TracePointDlg 574 graphically displays all of the trace output that has come from the associated network element from the external system•

The DialogShell 575 extends the/Dialog 516 to add a busy method and a dialog placement method. In addition, the DialogShell 575 adds a method that ensures other methods are not invoked until the window is closed.

The PhoneSetDlg 576 creates a GUI that allows the user to dial a number, to answer a call, and to release a call. The PhoneSetDlg 576 relies on its EndOffice network element object to make all of its calls and to instruct the PhoneSetDlg when a call is incoming.

The NetElementAction 577 is an interface used by the network elements to handle opening associated dialogs, such as the KouteTraceDlg 572, the TracePointDlg 574, and the PhoneSetDlg 576. In addition, the NetElementAction 577 invokes an event when the user clicks a network element on the GUI.

FIG. 5E is a continuation of FIGS. 5A-5D for an exemplary embodiment of an NDMSGUI 500. The objects of FIG. 5E comprise a TableEditorDlg 578, a TableDef 579, a LoginDlg 580, a DataSheet 581, a/DesktopPane 582, and a InternalFrame 583.

The TableEditorDlg 578 allows the user to see and to change database con-figuration tables as defined in the initialization files. When a TableEditorDlg 578 is constructed, it reads the initialization file to determine which table to display. The TableEditorDlg 578 shares a LoginDlg 580 so that the user will only be prompted one time for login information. The TableEdltorDlg 578 binds the LoginDlg 58'0 and the DataSheet 581 together.

The TableDef 579 is a helper class that is used to store the information read from the table configuration file when building a TableEditorDlg 578. The information gained from the TableDef 579 is used to construct data sheets, such as the DataSheet 581, that the user has requested. The TableDef 579 contains the table name, a uniform resource iocator (URL) to the database, and headings that the user has permission to view.

The LoginDlg 580 is a dialog that allows a user to supply their user name and password to another system for authentication. If the user name and password are valid, the login methods within the LoginDlg 580 will cache the password and return the Credentials 630 object (see FIG. 6B). If another request is made to login a user to a system that has already been authenticated for that user, then the cached password is used. Otherwise, the credentials are returned, and the authenticated flag is false. The LoginDlg 580 handles all error messages and implements the Passport 662 interface so that other objects can obtain the user name and the password. (See FIG. 6B.)

The DataSheet 581 constructs a simple and intuitive database interface for a single table. Columns are added after the DataSheet 581 is constructed by calling one of the add column methods. If the table is editable, the first column will contain a RowCommitter that allows a user either to commit and accept the data or to roll back to delete the entry and return to the prior work. The user must provide the user name and the password for entry into the database. This is obtained through operation of the LoginDlg 580.

The JDesktopPane 582 keeps a reference to a desk-top manager object. This class normally is used as the parent of the JInternalFrame 583 to provide a plausible desktop manager object to the JInternalFrame.

The JInternalFrame 583 provides the features of a native frame, including dragging, closing, resizing, title display, icon features, and support for a menu bar. The JInternalFrame 583 is used to describe the area of a component where normal job components should be placed.

FIG. 5F is a continuation of FIGS. 5A-5E for an exemplary embodiment of an NDMSGUI 500. The objects of FIG. 5F comprise a SeqDiagObject 584, a SequenceDiagram 585, a SeqDiagMessage 586, a SeqDiagAetivation 587, and a SeqDiagLifeLine 588.

The SeqDiagObject 584 displays the names of objects in an enclosed box. The position size of the SeqDiagObject 584 is controlled by the SequenceDiagram 585.

The SequenceDiagram 585 constructs a sequence diagram made up of objects, such as the SeqDiagObject 584, and their messages. The SeqDiagObjects are added to the diagram only during construction. New messages are added to the diagram and may be cleared from the diagram. Messages may be cached by the SequenceDiagram 585 to minimize their construction and deconstruction. The SequenceDiagram 585 also is responsible for laying out the SeqDiagObjects, the SeqDiagLifeLines, such as the SeqDiagLifeLine 588, and the SequenceDiagram messages using a FormLayout 560.

The SequenceDiagram 585 will notify any listeners when the messages are added and removed from the diagram. This can be used to make the SequenceDiagram 585 an interactive diagram, and not just a visual one. By default, the SequenceDiagram 585 tracks the active messages and colors them in a green color.

In addition, the SequenceDiagram 585 monitors the keyboard to determine when a user presses the home key, the end key, the up key, or the down key in order to process the traversal. If the user clicks on a message or presses one of the above-referenced keys, the corresponding message is activated. The SequenceDiagram 585 tracks and displays the active messages.

The SeqDiagMessage 586 draws the arrowed line between the SequenceDiagram activations, such as implemented by the SeqDiagActivation 587. The X and Y coordinates for the graphical display are controlled by the SequenceDiagram 585. However, the SeqDiagMessage 586 contains the logical X and Y coordinates for the SeqDiagActivation 587. When a SeqDiagMessage 586 is activated, the foreground colors change to an active color setting as opposed to the inactive color setting.

Implementations of the SeqDiagMessage 586 have an imbedded linked list in which the next and previous messages are stored. These values are set by the SequenceDiagram 585 when the SequenceDiagram has a message to the diagram. These values are later used for traversing through the diagram.

The SeqDiagAetivation 587 draws the activation bar and stores positioning of the SequenceDiagram 585 messages. The SeqDiagActivation 587 can send or receive messages.

The SeqDiagLifeLine 588 renders a lifeline, constructs new SequenceDiagram 585 activations, and manages their placement. Each SeqDiagActivation associated with this SeqDiagLifeLine 585 is contained within this component. SeqDiagActivations are cached and reused instead of constructed and deconstructed. The size and position of the SeqDiagLifeLine 588 is controlled by the SequenceDiagram 585.

Figure 6A:
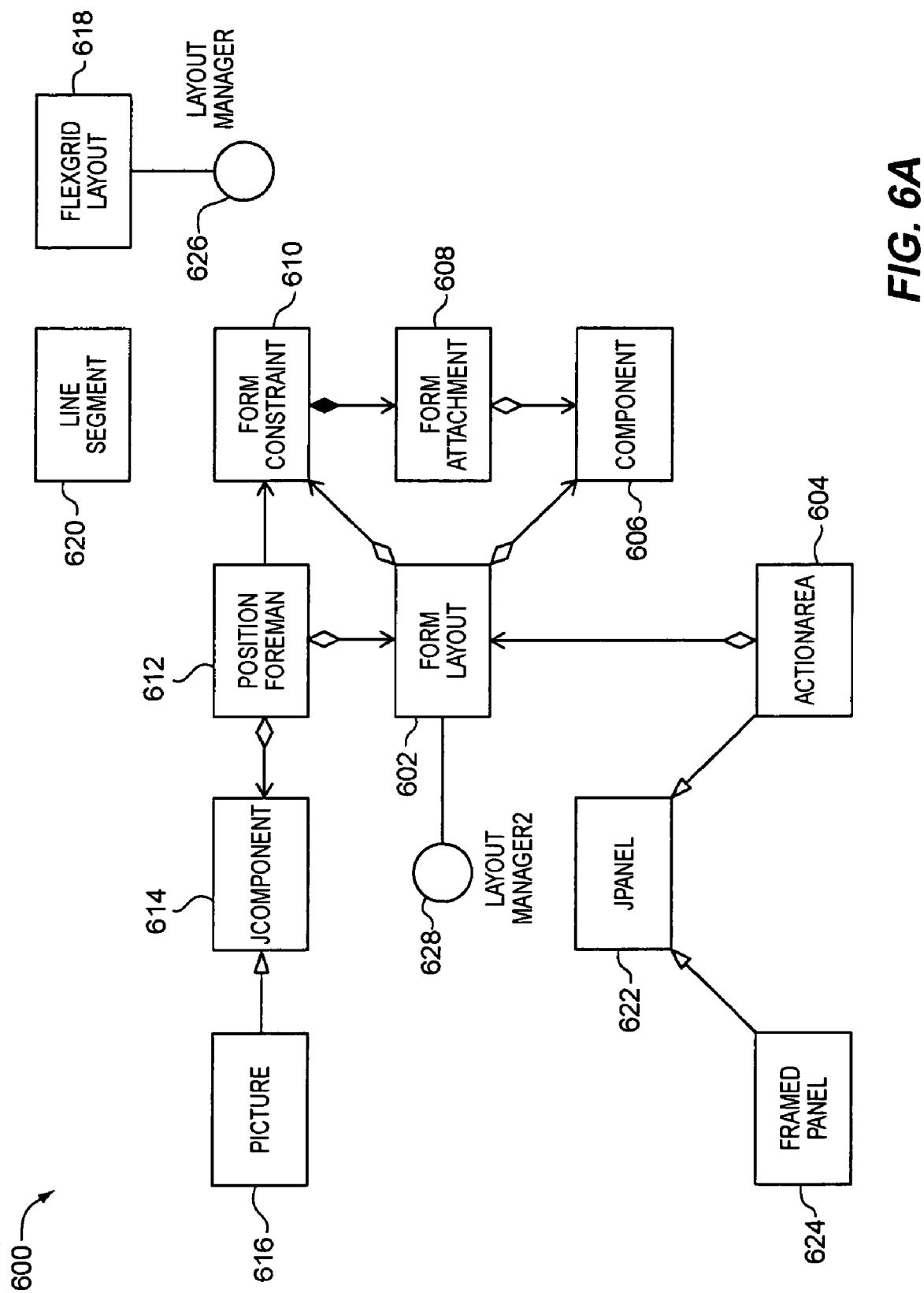
FIG. 6A is a block diagram of a slide library module in accordance with an embodiment of the present invention.

FIG. 6A illustrates an exemplary embodiment of a Slide library. The Slide 600 comprises a FormLayout 602, an ActionArea 604, a Component 606, a FormAttachinent 608, a FormConstraint 610, and a PositionForeman 612. The Slide 600 further comprises a JComponent 614, a Picture 616, a FlexGridLayout 618, a LineSegment 620, a JPanel 622, a FramedPanel 624, a LayoutManager 626, and a LayoutManager2 628.

The FormLayout 602, is a layout manager that implements a "form" style layout. This is accomplished by providing the mechanism for the forms children Component objects to specify their constraints by way of attachments. The attachment information is used to initially size the form and to resize the form. The attachments can be specified for one Or all of its sides, including the top, bottom, left, and right, to another component, to the opposite side of another component, to a position on a form, and to the form itself. All attachments are offset by a vertical or a horizontal spacing factor, depending on which side is being attached, unless an offset is explicitly specified for the attachment. The spacing factors are not used when attaching to the opposite side of another component.

The ActionArea 604 builds an action area for a dialog or main window. The ActionArea 604 is a JPanel 622 that contains a row of push buttons and has a top separator between it and the rest of the dialog.

The Component 606 is an object having a graphical representation that can be displayed on a screen in a window. The Component 606 can interact with a user. Examples of components are the buttons, check boxes, NetPaths, NetElements, and scroll bars of a typical graphical user interface.

The FormAttachment 608 stores specific attachment information for a single side attachment. One FormAttachment 608 is used by the FormConstraint 610 for each constraint. The attachment can be for one of the four sides of the associated Component 606, such as top, bottom, left, and right. In addition, the attachment specifies how to attach to the object in a specified position.

The FormConstraint 610 stores and accesses attachment information from the FormAttachment 608 for a component, such as the Component 606, which is managed by a FormLayout 602 manager. The FormConstraint 610 provides methods for attaching a component to another component in a specified position. The developer must instantiate a new FormConstraint object for each Component object that is being managed by the FormLayout 602 manager and call the appropriate method to set the attachments. In addition to the attachment information, each FormConstraint object contains a sequence number in which it was added to the form. This number can be used by the FormLayout 602 manager to determine when the component should be laid out. Typically, attachments to other components can only be made by components with a lower sequence number.

The PositionForeman 612 is used during the creation and layout of dialogs and for the layout of data entry fields for the dialogs using a FormLayout 602. A data entry style dialog is one where all entry fields typically are aligned in columns. The PositionForeman 612 provides the methods for sequentially creating label entry field pairs. For each field that is created, the fight side of the label and the left side of the field are attached as the current position. The position is advanced for the creation of a new field and label. When the Positi0nForeman 612 reaches the end of a row, the last field that was created is used as the top attachment for the next row. Positions can be skipped or manually advanced to create gaps in the columns.

The JComponent 614 is the base class for the Java swing components. The JComponent 614 provides keystroke handling methocis, action objects, support for international localization, slow-motion graphics rendering, and dialog construction using static methods.

The Picture 616 combines a graphic image and/or a label string in a push button type component. The placement of the label sizing can be controlled independent of the image as well as other configurable options, such as margin width, border width and color, spacing, and alignment.

The FlexGridLayout 618 is a layout manager that arranges its children objects in a grid. The FlexGridLayout 618 provides that a child object does not have to occupy an entire cell, and it is constrained to occupying only a single cell. Each child component can span one or more cells in the grid or can use its preferred width and height.

The LineSegment 620 provides a mechanism for working with lines by providing the methods with which to calculate the slope, length, rise, and run. A line consists of two coordinate pairs, typically referred to as (X1, Y1) and (X2, Y2).

The JPanel 622 is a generic container. The JPanel 622 extends the Java class object called JComponent.

The FramedPanel 624 is a panel that supports a border and a specified margin width. The FramePanel 624 provides a tighter layout than the JPanel 622 implementation.

The LayoutManager 626 is an interface for objects and provides for the layout of containers. The LayoutManager 626 provides the mechanism for entry to the FlexGridLayout 618.

The LayoutManager2 628 is an interface for classes that layout containers. This interface extends the LayoutManager 626 to function with layouts in terms of constraint objects that specify how and where components should be added to the layout.

Figure 6B:
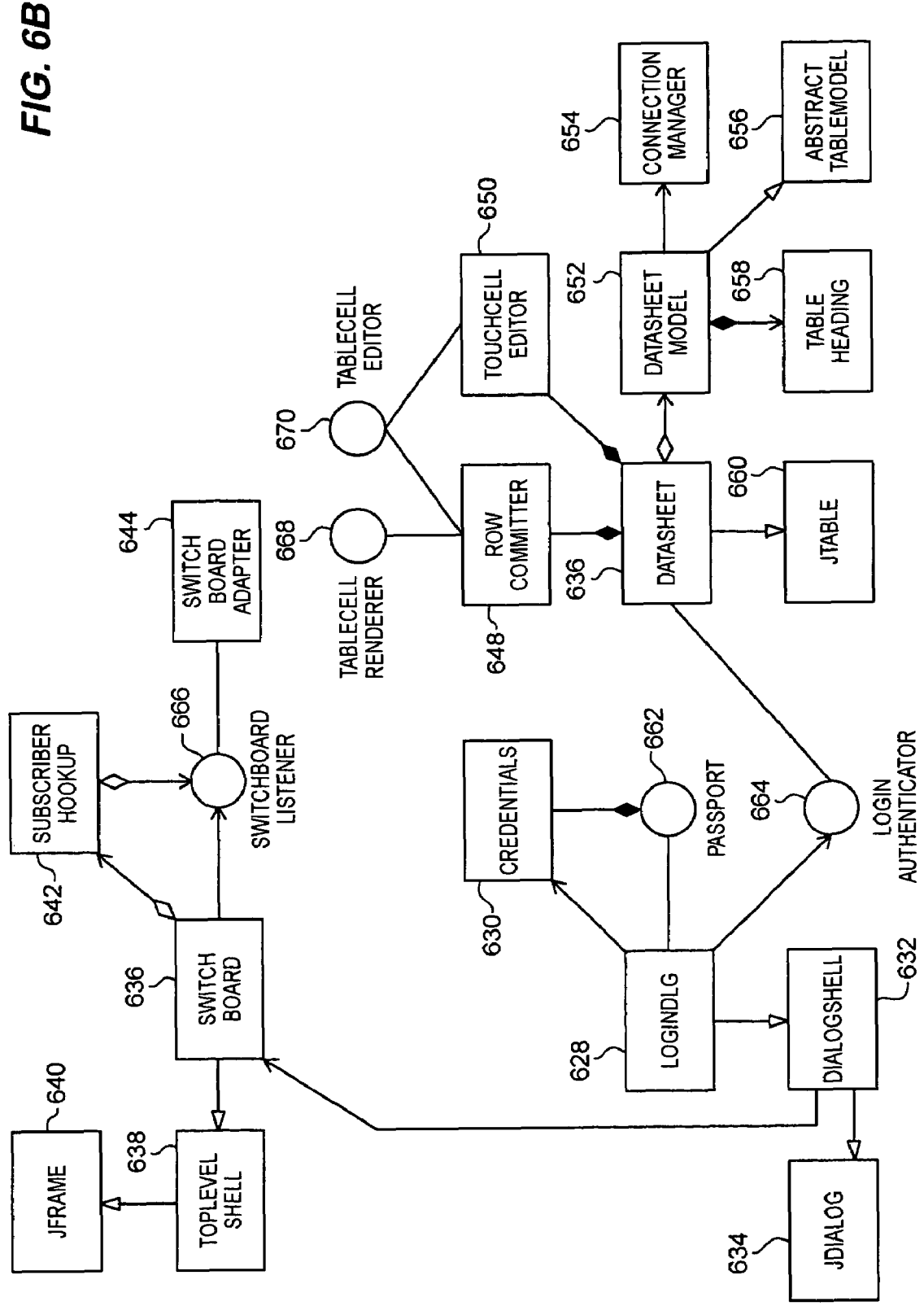
FIG. 6B is a continuation of the slide library module of FIG. 6A.

FIG. 6B is a continuation of FIG. 6A for the Slide 600. The objects and interfaces of FIG. 6B include a LoginDlg 628, a Credentials 630, a DialogShell 632, a JDialog 634, a SwitchBoard 636, a TopLevelShell 638, a JFrame 640, a SubscriberHookup 642, and a SwitchBoardAdapter 644. The objects and interfaces of FIG. 6B further include a DataSheet 646, a RowCommitter 648, a TouchCellEditor 650, a DataSheetModel 652, a ConnectionManager 654, an AbstractTableModel 656, a TableHeading 658, a JTable 660, a Passport 662, a LoginAuthenticator 664, a SwitchBoardListener 666, a TableCellRenderer 668 and a TableCellEditor 670.

The LoginDlg 628 is a dialog that allows a user to supply their user name and password to another system for authentication. If the user name and password are valid, the login methods within the LoginDlg 628 will cache the password and return the Credentials 630 object. If another request is made to login answer to a system that has already been authenticated for that user, then the cached password is used. Otherwise, the credentials are returned, and the authenticated flag is false. The LoginDlg 628 handles all error messages and implements the Passport 662 interface so that other objects can obtain the user name and the password.

The Credentials 630 provides for storage of the login information along with the success status of the login and authentication. The Credentials 630 contains the user login and password.

The DialogShell 632 extends the JDialog 634 to add a busy method and a dialog placement method~ In addition, the DialogShell 632 adds a method that ensures other methods are not invoked until the window is closed.

The JDialog 634 provides for creating a dialog window. The JDialog 634 is used to create a custom dialog or to invoke static methods to create a variety of standard dialogs. The JDialog 634 extends the dialog object.

The SwitchBoard 636 enables inter-object communication by providing a mechanism for objects to send messages to other objects without having to have a handle to the destination object. Subscriber objects get a subscription with the SwitchBoard 636, and users notify the subscribers by way of the subscriptions. Any object can subscribe with the SwitchBoard 636 for any range of subscriptions. Similarly, any object can notify subscribers and send messages by using the SwitchBoard 636.

The TopLevelShell 638 extends the JFrame 640 in order to add application busyness management, cursor control, and proper shut down of an application or an Applet. The busy model is based on a Switchboard 634 object and works in concert with a DialogShell 632. All DialogShells should exist in the same thread as the onTopLevelShell 638. Otherwise the TopLevelShells will show that they are busy even if they are not.

The JFrame 640 is a Java class that adds support for interposing input and painting behavior for the children objects of frames, such as GlassPane. In addition, the JFrame 640 provides support for children objects that are managed by a LayeredPane and for Swing MenuBars.

The SubscriberHookup 642 is an internal class used by the SwitchBoard 636 for binding a subscription name to a subscriber. The SubscriberHookup 642 may be used to unsubscribe to a SwitchBoard 636 when the subscription is dead. Subscriptions may be terminated without a handle to the SubscriberHookup 642 by calling the SwitchBoard 636.

The SwitchBoardAdapter 644 is an abstract adapter class for receiving and delivering notification events from the SwitchBoard 636. This class exists as a convenience for creating listener objects.

The DataSheet 646 constructs a simple and intuitive database interface for a single table. Columns are added after the DataSheet 646 is constructed by calling one of the add column methods. If the table is editable, the first column will contain a RowCommitter 648 which allows a user to either commit and accept the data or to roll back to delete the entry and return to the prior work. The user must provide the user name and the password for entry into the Database. This is obtained through operation of the LoginDlg 628.

The RowCommitter 648 provides the commit and abort buttons for the first column of a data sheet. The RowCommitter 648 also calls the appropriate methods in the DataSheet 646 when the associated buttons are pressed.

The TouchCellEditor 650 is used to edit cells in the DataSheet 646 other than the RowCommitter 648. The TouchCellEditor 650 intercepts the tab key to process traversal.

The DataSheetModel 652 provides genetic structured query language (SQL) operations for a single table. In addition to providing the standard operations for search, insert, update, and delete, the DataSheetModel 652 provides a facility to edit a row and either to commit or to rollback the changes on that row.

The ConnectionManager 654 stores the connection information so that a single method may be used to connect and to execute a structured query language statement. By using the ConnectionManager 654, a single close message will not accidentally close all open objects associated with the connection.

The AbstractTableModel 656 provides default implementations for the methods and the table model interfaces. The AbstractTableModel 656 provides for management of listener objects and methods and provides for generating TableModel events and dispatching them to listener objects.

The TableHeading 658 is a helper class used by the DataSheetModel 652 to store the heading information. This information includes the name of the data sheet, the width of the data sheet, and other data sheet information.

The JTable 660 is a user interface component that presents data in a two-dimensional table format. The JTable 660 makes provisions for customizing its rendering and editing and provides defaults for these features.

The Passport 662 is an interface that defines the mechanism needed to login a user to a system. The Passport 662 defines the login credentials that the LoginAuthenticator 664 must use.

The LoginAuthenticator 664 is an interface that defines the mechanism in which the passport 662 authenticates a user name and a user password.

The SwitchBoardListener 666 is an interface by which objects can listen for notifications on subscriptions to the SwitchBoard 636. The SwitchBoardListener 666 provides support for none, string, and Object message delivery:

The TableCellRenderer 668 is an interface that defines the methods used by any object that is a renderer for a cell. For example, finis interface would be used when building a data sheet.

The TableCellEditor 670 is an interface that defines the methods that would be used by an object to edit values of components. For example, this interface would be used when building a data sheet.

Figure 7:
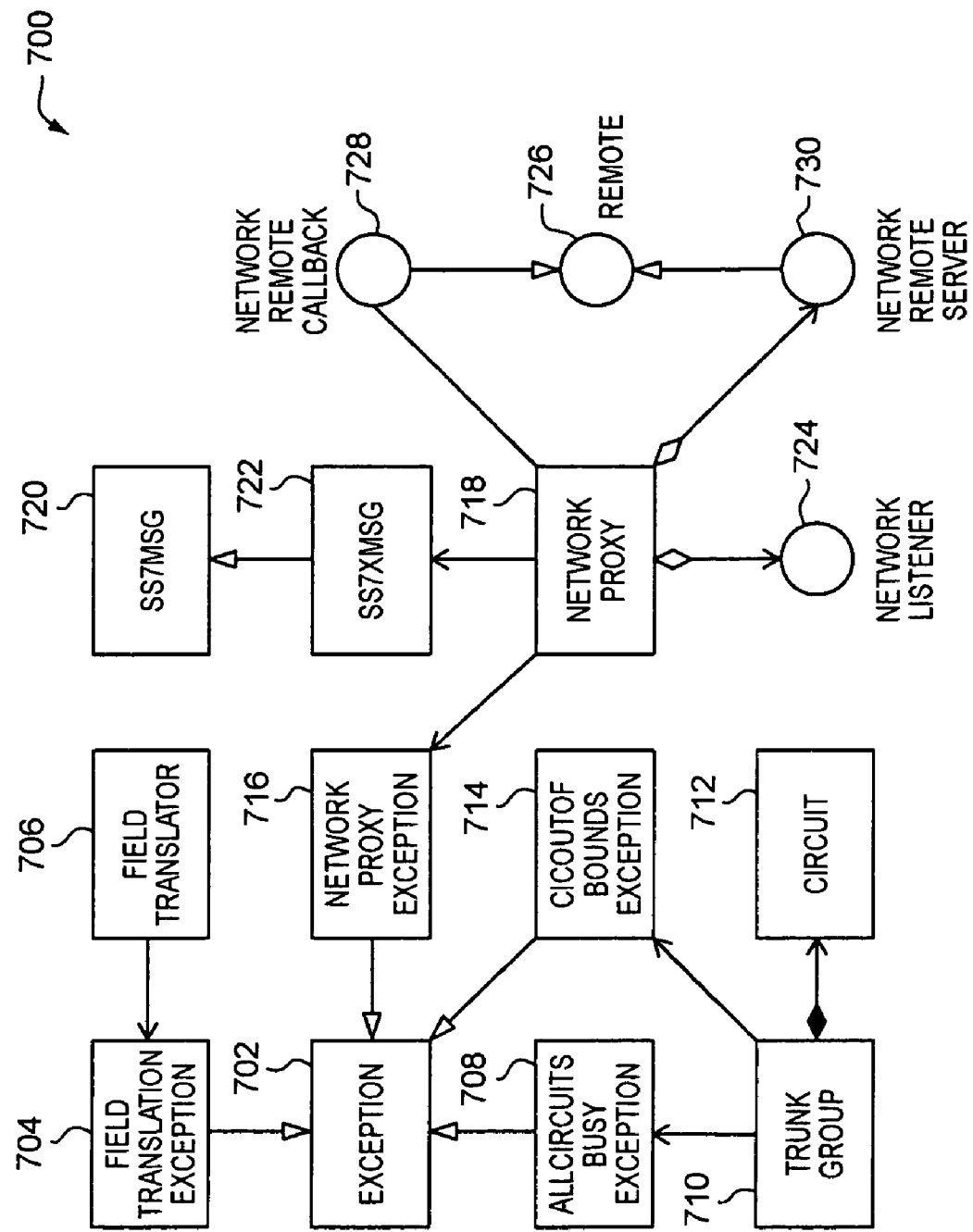
FIG. 7 is a block diagram of a network proxy module in accordance with an embodiment of the present invention.

FIG. 7 illustrates an exemplary embodiment of a NetworkProxy 700. The NetworkProxy 700 comprises an Exception 702, a FieldTranslationException 704, a FieldTranslator 706, an AllCircuitsBusyException 708, a TrunkGroup 710, a Circuit 712, a CICOutOfBoundsException 714, and a NetworkPmxyException 716. The objects and interfaces of the NetworkProxy 700 of FIG. 7 further include a NetworkProxy 718, an SS7Msg 720, an SS7XMsg 722, a NetworkListener 724, a Remote 726, a NetworkRemoteCallback 728, and a NetworkRemoteServer 730.

The Exception 702 indicates conditions that an application might want to catch. The Exception 702 is the main class object which includes a series of exception events, such as an activation exception, a security exception, an input-output exception, a run time exception, a user exception, and other error events.

The FieldTranslationException 704 is thrown when the FieldTranslator 706 encounters an error while parsing the fields file.

The FieldTranslator 706 loads the translation table for SS7 messages that are translated into a human readable string. Further, the FieldTranslator 706 translates the SS7 message into the human readable string.

The AllCircuitsBusyException 708 is thrown by the TrunkGroup 710 when an attempt to reserve a circuit fails because no circuits are idle. Therefore, this occurs when no circuits are available.

The TrunkGroup 710 provides the functions to reserve and associate circuits. The TrunkGroup 710 combines the reservation and association of the circuits into an easy to use class interface.

The Circuit 712 contains the data associated with a circuit in a TrunkGroup 710. The circuit data consists of a CIC, a DPC, an idle flag, the trunk group associated with the CIC, and the DPC associated with the trunk group.

The CICOutOfBoundsException 714 is thrown by the TrunkGroup 710 when an attempt to reserve a circuit fails because the CIC is out of range for the trunk.

The NetworkProxyException 716 defines an exception that can be thrown by the NetworkProxy 718. This exception is thrown when a call is made to an unbound NetworkProxy implementation.

The NetworkProxy 718 is a proxy object for a NetworkServer, including the NetworkServer 408, the DevelopmentNetwork 410, and the SimulatorNetwork 412. (See FIG. 4.) By using a proxy, the NDMSGUI 404 can connect to any implementation of a NetworkServer without having to hard code the server connection.

The SS7Msg 720 consists of the broken down components an SS7 message. The SS7 message is encoded and decoded on the network server in order to ensure that the NDMS GUI tool does not have to understand how to handle a real SS7 message since a real SS7 message is a bit stream. When an SS7 message is constructed, the NetworkProxy 406 can be used to allow the corresponding NetworkServer 408 to initialize the message based on the real network model configuration. (See FIG. 4.)

The SS7XMsg 722 extends the SS7Msg 720 to add rendering information, such as color, and to store the next network element and the previous network element. All network elements use the SS7XMsg 722 for its extended $87 information, while the underlying SS7Msg 720 is used to send an SS7 message {o the real network model.

The NetworkListener 724 is an interface that is used by the NetworkProxy 718 to notify an object that the NetworkServer 408 has issued a command. (See FIG. 4.) The NetPath and NetElement implement this interface in order to process trace output and to cut or to release a network path.

The Remote 726 is an interface that serves to identify all remote objects. Any object that is a Remote 726 object must directly or indirectly implement this interface. Only those methods specified in a remote interface are available remotely.

The NetworkRemoteCallback 728 is an interface that defines actions that can be invoked from a NetworkServer object implementation back to the client. This allows the implementation of the NetworkServer to send messages to the NetworkProxy that then can dispatch the messages to any object that has implemented the NetworkRemoteCallback 728 interface.

The NetworkRemoteServer 730 is an interface that defines methods that a NetworkServer has to implement in order to function as a remote network server for the NetWatcaer. The NetworkRemoteServer 730 can asynchronously make calls to the NetWatcher. tn addition, the NetworkRemoteServer 730 must process the SS7 messages submitted to it for the calling client and can return multiple new SS7 to the client.

Figure 8:
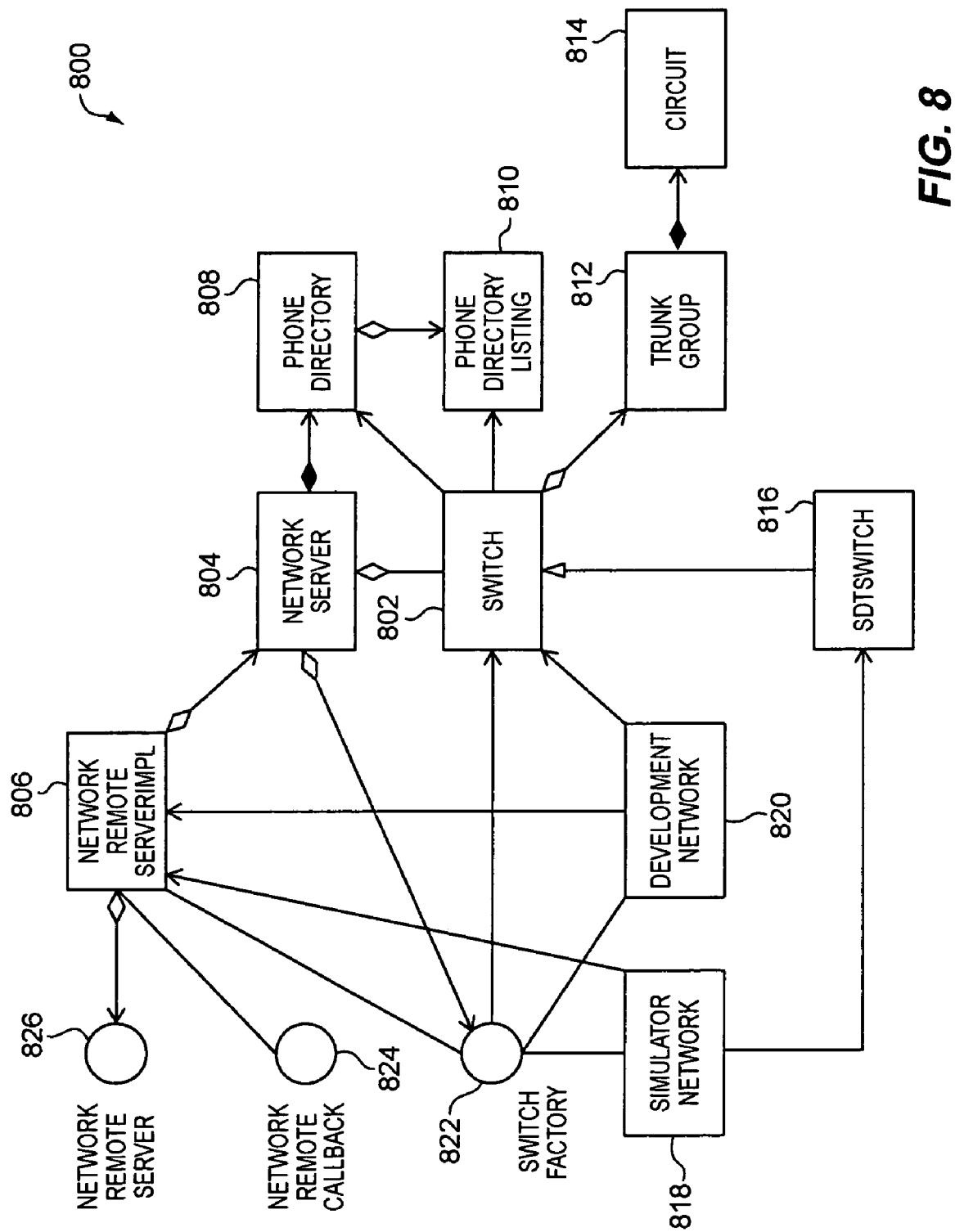
FIG. 8 is a block diagram of a network server module in accordance with an embodiment of the present invention.

FIG. 8 illustrates an exemplary embodiment of a NetworkServer 800. The NetworkServer 800 of FIG. 8 comprises a Switch 802, a NetworkServer 804, a NetworkRemoteServerImpl 806, a PhoneDirectory 808, a PlaoneDirectoryListing 810, a TmnkGroup 812, and a Circuit 814. The NetworkServer 800 further comprises an SDTSwitch 816, a SimulatorNetwork 818, a DevelopmentNetwork 820, a SwitchFactory 822, a NetworkRemoteCallback 824, and a NetworkRemoteServer 826.

The Switch 802 simulates a real switch and provides the basi~s for switching and for processes that occur in the routing engine. The Switch 802 is designed to be subclassed for other switch implemantatious. The default Switch implementation provides routing, circuit reservation, path cut through, and release. When an IAM is received, the Switch 802 checks the PhoneDirectory to determine if an EndOffice is connected to the Switch and that the EndOffice services the Switch. If the EndOffice services the Switch, the IAM is sent to that EndOffice. Otherwise, the IAM is forwarded to a switch that handles out-of-network calls for the destination EridOffice. AI1 other messages are routed to their destinations. It will be appreciated that other SS7 messages and other call signaling is routed and processed in the similar rammer.

The NetworkServer 804 implements instances of remote NetworkServers. Since each client may get its own instance of a NetworkServer, multiple clients can be connected to the same NetworkServer. The NetworkServer 804 uses the SwitchFactory 822 to create switches for the network model. If the NetworkServer 804 is running in a shared mode with multiple network model files, each model file has a NetworkServer object and one or more connected clients.

The NetworkRemoteServerImpl 806 implements an instance of a NetworkServer. The NetworkRemoteServerImpl 806 provides the basic processing required for different switch and call processor implementations. A different NetworkServer object is instantiated for each new client connection to handle all requests for that client.

The PhoneDirectory 808 associates a phone number of a phone set with a PhoneDirectoryListing retained by a switch. The EndOffice that services the phone number and the out of network Switch that services the EndOffice is listed in the PhoneDirectory listing. The PhoneDirectory 808 is populated by the EndOffices with their associated phone set phone number data after the EndOffices have been initialized.

The PhoneDirectoryListing 810 stores the information associated with a phone number. This includes the phone number, the EndOffice point code, and the out of network switch point code that services the EndOffice.

The TrunkGroup 812 provides the functions to reserve and associate circuits. The TnmkGroup 812 combines the reservation and association of the circuits into an easy to use class interface.

The Circuit 814 contains the data associated with a circuit in a TrunkGroup 812. The circuit data consists of a CIC, a DPC~ an idle flag, the mink group associated with the CIC, and the DPC associated with the trunk group.

The SDTSwitch 816 extends the Switch 802 to connect to an extended simulator process via a socket. A socket is an endpoint for a communication between two machines. The SDTSwitch 816 uses a shared library to encode and decode SS7 messages which are passed as integrated services user part (ISUP) structures over the socket.

The SimulatorNetwork 818 implements the SwitchFactory 822 and is responsible for instantiating a NetworkRernoteServerImpl 806 with it as the SwitchFactory. The SimulatorNetwork 818 assists in building a simulated network of network elements. The SimulatorNetwork 818 is use to build an implementation of a NetworkServer.

The DevelopmentNetwork 820 implements the SwitchFactory 822 and is responsible for instantiating a NetworkRemoteServerImpl 806 with it as the SwitchFactory. Each switch that is created in the Developmentnetwork 820 is an instance of the Switch 802. The DevelopmentNetwork 820 is used to build an implementation of the NetworkServer for developing network models having network elements.

The SwitchFactory 822 is an interface that defines methods for instantiating a Switch 802 and the methods to initialize an SS7XMsg. Both the Switch and the SS7XMsg must be implemented by a class that is going to be used by the NetworkServer 804.

The NetworkRemoteCallback 824 is an interface that defines actions that can be invoked from a NetworkServer object implementation back to the client. This allows the implementation of the NetworkServer to send messages to the NetworkProxy that then can dispatch the messages to any object that has implemented the NetworkRemoteCallback.

The NetworkRemoteServer 826 is an interface that defines methods that a network server has to implement in order to junction as a remote network server for the NetWatcher: The NetworkRemoteServer 826 can asynchronously make calls to the NetWatcher. In addition, the NetworkRemoteServer 826 must process the SS7 messages submitted to it for the calling client and can return multiple new SS7 messages to the client.

Those skilled in the art will appreciate that variations from the specific embodiments disclosed above are contemplated by the invention. The invention should not be restricted to the above embodiments, but should be measured by the following claims.

We claim:

1. A network management system comprising:

a graphical user interface configured to display a graphical representation of a model network and a graphical representation of operations of the model network wherein the model network comprises a plurality of model elements including a model media gateway controller coupled to a model media gateway;

a computer system coupled to the graphical user interface and configured to receive a message from the graphical user interface, process the message to generate call signaling for a call through the model network, transfer the call signaling to a live media gateway controller that corresponds to the model media gateway controller and is coupled to a live media gateway that corresponds to the model media gateway, receive a control message indicating an identifier for the call from the live media gateway controller, process the control message to generate a response, and transfer the response to the graphical user interface wherein the response indicates one of the operations of the model network.

2. The network management system of claim 1 wherein the graphical user interface is configured to receive the response and display the one operation of the model network.

3. The network management system of claim 2 wherein the one operation comprises the model media gateway controller transferring a graphical representation of the control message to the model media gateway.

4. The network management system of claim 1 wherein the live media gateway interworks call traffic from a non-packet based network to a packet based network.

5. The network management system of claim 4 wherein the identifier for the call comprises an address in the packet based network.

6. The network management system of claim 1 wherein the model media gateway is coupled to a model non-packet based network and a model packet based network.

7. The network management system of claim 1 wherein the call signaling comprises signaling system 7 (SS7) signaling.

8. The network management system of claim 1 wherein the call in the model network comprises a test call.

9. A method of operating a network management system wherein the network management system comprises a graphical user interface configured to display a graphical representation of a model network and a graphical representation of operations of the model network wherein the model network comprises a plurality of model elements including a model media gateway controller coupled to a model media gateway, and a computer system coupled to the graphical user interface, the method comprising:

in the computer system, receiving a message from the graphical user interface;

generating call signaling for a call through the model network;

transferring the call signaling for the call to a live media gateway controller that corresponds to the model media gateway controller and is coupled to a live media gateway that corresponds to the model media gateway;

receiving a control message indicating an identifier for the call from the live media gateway controller;

processing the control message to generate a response to the graphical user interface wherein the response indicates one of the operations of the model network; and transferring the response to the graphical user interface.

10. The method of claim 9 further comprising, in the graphical user interface, receiving the response and displaying the one operation of the model network.

11. The method of claim 10 wherein the one operation comprises the model media gateway controller transferring a graphical representation of the control message to the model media gateway.

12. The method of claim 9 wherein the live media gateway interworks call traffic from a non-packet based network to a packet based network.

13. The method of claim 12 wherein the identifier for the call comprises an address in the packet based network.

14. The method of claim 9 wherein the model media gateway is coupled to a model non-packet based network element and a model packet based network element.

15. The method of claim 9 wherein the call signaling comprises signaling system 7 (SS7) signaling.

16. The method of claim 9 wherein the call in the model network comprises a test call.

17. A computer readable storage medium having software stored thereon for operating a network management system, wherein the software is operational when executed by a processing system to direct the processing system to:

display in a graphical user interface a graphical representation of a model network and a graphical representation of operations of the model network wherein the model network comprises a plurality of model elements including a model media gateway controller coupled to a model media gateway, receive a message from the graphical user interface, process the message to generate call signaling for a call through the model network and transfer the call signaling to a live media gateway controller that corresponds to the model media gateway controller and is coupled to a live media gateway that corresponds to the model media gateway, receive a control message indicating an identifier for the call from the live media gateway controller, process the control message to generate a response, and transfer the response to the graphical user interface wherein the response indicates a one of the operations of the model network.

* * * * *